US011330489B2

(12) United States Patent
Prasad et al.

(10) Patent No.: US 11,330,489 B2
(45) Date of Patent: May 10, 2022

(54) APPARATUS, METHOD AND COMPUTER PROGRAM

(71) Applicant: NOKIA TECHNOLOGIES OY, Espoo (FI)

(72) Inventors: Athul Prasad, Helsinki (FI); Mikko Johannes Honkala, Espoo (FI); Zexian Li, Espoo (FI); Leo Mikko Johannes Kärkkäinen, Helsinki (FI); Akos Vetek, Espoo (FI); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/733,599

(22) PCT Filed: Mar. 20, 2018

(86) PCT No.: PCT/EP2018/056982
§ 371 (c)(1),
(2) Date: Sep. 10, 2020

(87) PCT Pub. No.: WO2019/179602
PCT Pub. Date: Sep. 26, 2019

(65) Prior Publication Data
US 2021/0219197 A1 Jul. 15, 2021

(51) Int. Cl.
*H04W 36/08* (2009.01)
*H04W 36/00* (2009.01)
(Continued)

(52) U.S. Cl.
CPC ........ *H04W 36/08* (2013.01); *H04W 36/0011* (2013.01); *H04W 36/245* (2013.01); *H04W 36/36* (2013.01)

(58) Field of Classification Search
CPC ............. H04W 36/08; H04W 36/0011; H04W 36/245; H04W 36/26
See application file for complete search history.

(56) References Cited

U.S. PATENT DOCUMENTS

2014/0287754 A1 9/2014 Goldhamer
2015/0063300 A1* 3/2015 Wenger ................ H04W 36/08
370/331
(Continued)

FOREIGN PATENT DOCUMENTS

CN 107819840 A 3/2018
WO 2016155918 A1 10/2016

OTHER PUBLICATIONS

International Search Report and Written Opinion for International Application No. PCT/EP2018/056982, dated Oct. 1, 2018, 17 pages.
(Continued)

*Primary Examiner* — Barry W Taylor
(74) *Attorney, Agent, or Firm* — Brake Hughes Bellermann LLP

(57) ABSTRACT

An apparatus comprises: at least one processor; and at least one memory including computer program code; the at least one memory and the computer program code configured to, with the at least one processor, cause the apparatus at least to: use a first base station central unit coupled to a first base station distributed unit in dependence on a computational capacity of the first base station central unit.

21 Claims, 15 Drawing Sheets

(51) Int. Cl.
  *H04W 36/24*  (2009.01)
  *H04W 36/36*  (2009.01)

(56) References Cited

U.S. PATENT DOCUMENTS

| | | | |
|---|---|---|---|
| 2017/0105130 A1 | 4/2017 | Chen et al. | |
| 2018/0376380 A1* | 12/2018 | Leroux | H04W 76/18 |
| 2019/0053183 A1* | 2/2019 | Park | H04W 76/27 |
| 2020/0351971 A1* | 11/2020 | Fiorani | H04B 17/318 |
| 2020/0374771 A1* | 11/2020 | Hirata | H04W 36/0055 |

OTHER PUBLICATIONS

Office Action for Indian Application No. 202047044891, dated Dec. 3, 2021, 7 pages.

* cited by examiner

APPARATUS, METHOD AND COMPUTER PROGRAM

CROSS-REFERENCE TO RELATED APPLICATIONS

This application is a national stage entry of International Application No. PCT/EP2018/056982, filed Mar. 20, 2018, entitled "APPARATUS, METHOD AND COMPUTER PROGRAM" which is hereby incorporated by reference in its entirety.

FIELD OF THE DISCLOSURE

The present disclosure relates to an apparatus, methods and computer program to manage communication in a communication system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) of the Universal Mobile Telecommunications System (UMTS) radio-access technology. Another example communication system is so called 5G radio or NR (new radio) access technology.

SUMMARY

According to an aspect there is provided an apparatus comprising at least one processor and at least one memory including computer code for one or more programs, the at least one memory and the computer code configured, with the at least one processor, to cause the apparatus at least to: use a first base station central unit coupled to a first base station distributed unit in dependence on a computational capacity of the first base station central unit.

The computational capacity may be an available computational capacity.

The at least one memory and the computer program code may be configured to, with the at least one processor, cause the apparatus at least to: use the first base station central unit coupled to the first base station distributed unit when performing at least one of selecting, reselecting and handing over of a user equipment to the first base station central unit coupled to the first base station distributed unit.

Determining to use the first base station central unit coupled to the first base station distributed unit when performing at least one of selecting, reselecting and handing over of a user equipment to the first base station central unit coupled to the first base station distributed unit may be performed by the user equipment, the base station central unit or the first base station distributed unit.

The at least one memory and the computer program code may be configured to, with the at least one processor, cause the apparatus at least to: use the first base station central unit coupled to the first base station distributed unit when setting up a session flow via the first base station central unit coupled to the first base station distributed unit.

Determining to use the first base station central unit coupled to the first base station distributed unit when setting up a session flow via the first base station central unit coupled to the first base station distributed unit may be performed by a core network function (e.g. access management function).

The at least one memory and the computer program code may be configured to, with the at least one processor, cause the apparatus at least to: use the first base station central unit coupled to the first base station distributed unit when setting up a unicast, multicast or broadcast session flow via the first base station central unit and the first base station distributed unit.

Determining to use the first base station central unit coupled to the first base station distributed unit when setting up a unicast, multicast or broadcast session flow via the first base station central unit and the first base station distributed unit may be performed by a core network function (e.g. access management function and/or session management function).

The at least one memory and the computer program code may be configured to, with the at least one processor, cause the apparatus at least to: if the computational capacity of the first base station central unit is lower than a threshold, determining that a multicast or broadcast session flow is to be setup via the first base station central unit and the first base station distributed unit without uplink feedback.

The at least one memory and the computer program code may be configured to, with the at least one processor, cause the apparatus at least to: if the computational capacity of the first base station central unit is greater than or equal to a threshold, determining that a unicast session flow is to be setup via the first base station central unit and the first base station distributed unit without uplink feedback.

The at least one memory and the computer program code may be configured to, with the at least one processor, cause the apparatus at least to: determine a computational complexity of a past session flow via the first base station central unit and the first base station distributed unit; and using the computational capacity of the first base station central unit and the computational complexity of the past session flow set to predict an outcome of setting up a session flow via the first base station central unit and the first base station distributed unit.

The at least one memory and the computer program code may be configured to, with the at least one processor, cause the apparatus at least to: compare the computational capacity of the first base station central unit and the computational capacity of a second base station central unit coupled to a second base station distributed unit; and determine whether to use the first base station central unit coupled to the first base station distributed unit or the second base station central unit coupled to the second base station distributed unit in dependence on the comparing.

The at least one memory and the computer program code may be configured to, with the at least one processor, cause the apparatus at least to: report the computational capacity of the first base station central unit to a second base station distributed unit coupled to a second base station central unit.

The at least one memory and the computer program code may be configured to, with the at least one processor, cause the apparatus at least to: report the computational capacity of the first base station central unit to a second base station central unit coupled to a second base station distributed unit.

The at least one memory and the computer program code may be configured to, with the at least one processor, cause the apparatus at least to: use the first base station central unit coupled to the first base station distributed unit in dependence on a physical resource availability of the first base station distributed unit.

The at least one memory and the computer program code may be configured to, with the at least one processor, cause the apparatus at least to: determine a computational complexity of a service requested by a user equipment; and use the first base station central unit coupled to the first base station distributed unit in dependence on the computational complexity of the service.

The at least one memory and the computer program code may be configured to, with the at least one processor, cause the apparatus at least to: use the first base station central unit coupled to the first base station distributed unit in dependence on a measurement of a reference signal transmitted by the first base station distributed unit.

The at least one memory and the computer program code may be configured to, with the at least one processor, cause the apparatus at least to: configure a user equipment to measure the reference signal transmitted by the first base station distributed unit.

The at least one memory and the computer program code may be configured to, with the at least one processor, cause the apparatus at least to: receive from the first base station distributed unit the computational capacity of the first base station central unit.

The at least one memory and the computer program code may be configured to, with the at least one processor, cause the apparatus at least to: send a request to the first base station distributed unit for a service.

The at least one memory and the computer program code may be configured to, with the at least one processor, cause the apparatus at least to: send a request to the first base station distributed unit to perform selection, reselection or hand over.

The at least one memory and the computer program code may be configured to, with the at least one processor, cause the apparatus at least to: send a request to the first base station distributed unit to set up a session flow.

The at least one memory and the computer program code may be configured to, with the at least one processor, cause the apparatus at least to: send a request to the first base station distributed unit to set up a unicast, multicast or broadcast session flow.

According to an aspect there is provide an apparatus comprising means for: determining to use a first base station central unit coupled to a first base station distributed unit in dependence on a computational capacity of the first base station central unit.

The computational capacity may be an available computational capacity.

The apparatus may comprise means for: determining to use the first base station central unit coupled to the first base station distributed unit when performing at least one of selecting, reselecting and handing over of a user equipment to the first base station central unit coupled to the first base station distributed unit.

Determining to use the first base station central unit coupled to the first base station distributed unit when performing at least one of selecting, reselecting and handing over of a user equipment to the first base station central unit coupled to the first base station distributed unit may be performed by the user equipment, the base station central unit or the first base station distributed unit.

The apparatus may comprise means for: determining to use the first base station central unit coupled to the first base station distributed unit when setting up a session flow via the first base station central unit coupled to the first base station distributed unit.

Determining to use the first base station central unit coupled to the first base station distributed unit when setting up a session flow via the first base station central unit coupled to the first base station distributed unit may be performed by a core network function (e.g. access management function).

The apparatus may comprise means for: determining to use the first base station central unit coupled to the first base station distributed unit when setting up a unicast, multicast or broadcast session flow via the first base station central unit and the first base station distributed unit.

Determining to use the first base station central unit coupled to the first base station distributed unit when setting up a unicast, multicast or broadcast session flow via the first base station central unit and the first base station distributed unit may be performed by a core network function (e.g. access management function and/or session management function).

The apparatus may comprise means for: if the computational capacity of the first base station central unit is lower than a threshold, determining that a multicast or broadcast session flow is to be setup via the first base station central unit and the first base station distributed unit without uplink feedback.

The apparatus may comprise means for: if the computational capacity of the first base station central unit is greater than or equal to a threshold, determining that a unicast session flow is to be setup via the first base station central unit and the first base station distributed unit without uplink feedback.

The apparatus may comprise means for: determining a computational complexity of a past session flow via the first base station central unit and the first base station distributed unit; and using the computational capacity of the first base station central unit and the computational complexity of the past session flow set to predict an outcome of setting up a session flow via the first base station central unit and the first base station distributed unit.

The apparatus may comprise means for: comparing the computational capacity of the first base station central unit and the computational capacity of a second base station central unit coupled to a second base station distributed unit; and determining whether to use the first base station central unit coupled to the first base station distributed unit or the second base station central unit coupled to the second base station distributed unit in dependence on the comparing.

The apparatus may comprise means for: reporting the computational capacity of the first base station central unit to a second base station distributed unit coupled to a second base station central unit.

The apparatus may comprise means for: reporting the computational capacity of the first base station central unit to a second base station central unit coupled to a second base station distributed unit.

The apparatus may comprise means for: determining to use the first base station central unit coupled to the first base station distributed unit in dependence on a physical resource availability of the first base station distributed unit.

The apparatus may comprise means for: determining a computational complexity of a service requested by a user equipment; and use the first base station central unit coupled to the first base station distributed unit in dependence on the computational complexity of the service.

The apparatus may comprise means for: determining to use the first base station central unit coupled to the first base station distributed unit in dependence on a measurement of a reference signal transmitted by the first base station distributed unit.

The apparatus may comprise means for: configuring a user equipment to measure the reference signal transmitted by the first base station distributed unit.

The apparatus may comprise means for: receiving from the first base station distributed unit the computational capacity of the first base station central unit.

The apparatus may comprise means for: sending a request to the first base station distributed unit for a service.

The apparatus may comprise means for: sending a request to the first base station distributed unit to perform selection, reselection or hand over.

The apparatus may comprise means for: sending a request to the first base station distributed unit to set up a session flow.

The apparatus may comprise means for: sending a request to the first base station distributed unit to set up a unicast, multicast or broadcast session flow.

According to an aspect there is provided a method comprising: determining to use a first base station central unit coupled to a first base station distributed unit in dependence on a computational capacity of the first base station central unit.

The computational capacity may be an available computational capacity.

The method may comprise: determining to use the first base station central unit coupled to the first base station distributed unit when performing at least one of selecting, reselecting and handing over of a user equipment to the first base station central unit coupled to the first base station distributed unit.

Determining to use the first base station central unit coupled to the first base station distributed unit when performing at least one of selecting, reselecting and handing over of a user equipment to the first base station central unit coupled to the first base station distributed unit may be performed by the user equipment, the base station central unit or the first base station distributed unit.

The method may comprise: determining to use the first base station central unit coupled to the first base station distributed unit when setting up a session flow via the first base station central unit coupled to the first base station distributed unit.

Determining to use the first base station central unit coupled to the first base station distributed unit when setting up a session flow via the first base station central unit coupled to the first base station distributed unit may be performed by a core network function (e.g. access management function).

The method may comprise: determining to use the first base station central unit coupled to the first base station distributed unit when setting up a unicast, multicast or broadcast session flow via the first base station central unit and the first base station distributed unit.

Determining to use the first base station central unit coupled to the first base station distributed unit when setting up a unicast, multicast or broadcast session flow via the first base station central unit and the first base station distributed unit may be performed by a core network function (e.g. access management function and/or session management function).

The method may comprise: if the computational capacity of the first base station central unit is lower than a threshold, determining that a multicast or broadcast session flow is to be setup via the first base station central unit and the first base station distributed unit without uplink feedback.

The method may comprise: if the computational capacity of the first base station central unit is greater than or equal to a threshold, determining that a unicast session flow is to be setup via the first base station central unit and the first base station distributed unit without uplink feedback.

The method may comprise: determining a computational complexity of a past session flow via the first base station central unit and the first base station distributed unit; and using the computational capacity of the first base station central unit and the computational complexity of the past session flow set to predict an outcome of setting up a session flow via the first base station central unit and the first base station distributed unit.

The method may comprise: comparing the computational capacity of the first base station central unit and the computational capacity of a second base station central unit coupled to a second base station distributed unit; and determining whether to use the first base station central unit coupled to the first base station distributed unit or the second base station central unit coupled to the second base station distributed unit in dependence on the comparing.

The method may comprise: reporting the computational capacity of the first base station central unit to a second base station distributed unit coupled to a second base station central unit.

The method may comprise: reporting the computational capacity of the first base station central unit to a second base station central unit coupled to a second base station distributed unit.

The method may comprise: determining to use the first base station central unit coupled to the first base station distributed unit in dependence on a physical resource availability of the first base station distributed unit.

The method may comprise: determining a computational complexity of a service requested by a user equipment; and use the first base station central unit coupled to the first base station distributed unit in dependence on the computational complexity of the service.

The method may comprise: determining to use the first base station central unit coupled to the first base station distributed unit in dependence on a measurement of a reference signal transmitted by the first base station distributed unit.

The method may comprise: configuring a user equipment to measure the reference signal transmitted by the first base station distributed unit.

The method may comprise: receiving from the first base station distributed unit the computational capacity of the first base station central unit.

The method may comprise: sending a request to the first base station distributed unit for a service.

The method may comprise: sending a request to the first base station distributed unit to perform selection, reselection or hand over.

The method may comprise: sending a request to the first base station distributed unit to set up a session flow.

The method may comprise: sending a request to the first base station distributed unit to set up a unicast, multicast or broadcast session flow.

According to an aspect there is provided a computer program comprising computer executable code which when run on at least one processor is configured to:

use a first base station central unit coupled to a first base station distributed unit in dependence on a computational capacity of the first base station central unit.

The computational capacity may be an available computational capacity.

The computer program may comprise computer executable code which when run on at least one processor is configured to: use the first base station central unit coupled to the first base station distributed unit when performing at least one of selecting, reselecting and handing over of a user equipment to the first base station central unit coupled to the first base station distributed unit.

Determining to use the first base station central unit coupled to the first base station distributed unit when performing at least one of selecting, reselecting and handing over of a user equipment to the first base station central unit coupled to the first base station distributed unit may be performed by the user equipment, the base station central unit or the first base station distributed unit.

The computer program may comprise computer executable code which when run on at least one processor is configured to: use the first base station central unit coupled to the first base station distributed unit when setting up a session flow via the first base station central unit coupled to the first base station distributed unit.

Determining to use the first base station central unit coupled to the first base station distributed unit when setting up a session flow via the first base station central unit coupled to the first base station distributed unit may be performed by a core network function (e.g. access management function).

The computer program may comprise computer executable code which when run on at least one processor is configured to: use the first base station central unit coupled to the first base station distributed unit when setting up a unicast, multicast or broadcast session flow via the first base station central unit and the first base station distributed unit.

Determining to use the first base station central unit coupled to the first base station distributed unit when setting up a unicast, multicast or broadcast session flow via the first base station central unit and the first base station distributed unit may be performed by a core network function (e.g. access management function and/or session management function).

The computer program may comprise computer executable code which when run on at least one processor is configured to: if the computational capacity of the first base station central unit is lower than a threshold, determining that a multicast or broadcast session flow is to be setup via the first base station central unit and the first base station distributed unit without uplink feedback.

The computer program may comprise computer executable code which when run on at least one processor is configured to: if the computational capacity of the first base station central unit is greater than or equal to a threshold, determining that a unicast session flow is to be setup via the first base station central unit and the first base station distributed unit without uplink feedback.

The computer program may comprise computer executable code which when run on at least one processor is configured to: determine a computational complexity of a past session flow via the first base station central unit and the first base station distributed unit; and using the computational capacity of the first base station central unit and the computational complexity of the past session flow set to predict an outcome of setting up a session flow via the first base station central unit and the first base station distributed unit.

The computer program may comprise computer executable code which when run on at least one processor is configured to: compare the computational capacity of the first base station central unit and the computational capacity of a second base station central unit coupled to a second base station distributed unit; and determine whether to use the first base station central unit coupled to the first base station distributed unit or the second base station central unit coupled to the second base station distributed unit in dependence on the comparing.

The computer program may comprise computer executable code which when run on at least one processor is configured to: report the computational capacity of the first base station central unit to a second base station distributed unit coupled to a second base station central unit.

The computer program may comprise computer executable code which when run on at least one processor is configured to: report the computational capacity of the first base station central unit to a second base station central unit coupled to a second base station distributed unit.

The computer program may comprise computer executable code which when run on at least one processor is configured to: use the first base station central unit coupled to the first base station distributed unit in dependence on a physical resource availability of the first base station distributed unit.

The computer program may comprise computer executable code which when run on at least one processor is configured to: determine a computational complexity of a service requested by a user equipment; and use the first base station central unit coupled to the first base station distributed unit in dependence on the computational complexity of the service.

The computer program may comprise computer executable code which when run on at least one processor is configured to: use the first base station central unit coupled to the first base station distributed unit in dependence on a measurement of a reference signal transmitted by the first base station distributed unit.

The computer program may comprise computer executable code which when run on at least one processor is configured to: configure a user equipment to measure the reference signal transmitted by the first base station distributed unit.

The computer program may comprise computer executable code which when run on at least one processor is configured to: receive from the first base station distributed unit the computational capacity of the first base station central unit.

The computer program may comprise computer executable code which when run on at least one processor is configured to: send a request to the first base station distributed unit for a service.

The computer program may comprise computer executable code which when run on at least one processor is configured to: send a request to the first base station distributed unit to perform selection, reselection or hand over.

The computer program may comprise computer executable code which when run on at least one processor is configured to: send a request to the first base station distributed unit to set up a session flow.

The computer program may comprise computer executable code which when run on at least one processor is configured to: send a request to the first base station distributed unit to set up a unicast, multicast or broadcast session flow.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which.

DETAILED DESCRIPTION OF THE FIGURES

In the following certain exemplifying embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIG. 1 to assist in understanding the technology underlying the described examples.

Figure 1:
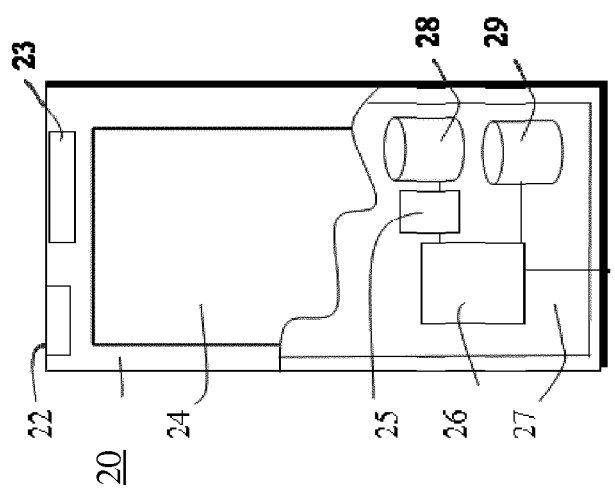
FIG. 1 shows a schematic representation of an example of an end user device according to an embodiment.

A communication device 20 or terminal such as shown in FIG. 1 can be provided wireless access via base stations or similar wireless transmitter and/or receiver nodes providing access points of a radio access system.

The communication device or user equipment (UE) 20 may comprise any suitable device capable of at least receiving wireless communication of data. For example, the device can be handheld data processing device equipped with radio receiver, data processing and user interface apparatus. Non-limiting examples include a mobile station (MS) such as a mobile phone or what is known as a 'smart phone', an end user a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewelry and so on, universal serial bus (USB) sticks with wireless capabilities, modem data cards, machine type devices or any combinations of these or the like.

In the following it will be referred to a user equipment. However, it will be understood that the teachings are equally applicable to any of the above devices.

FIG. 1 shows a schematic, partially sectioned view of a possible communication device. More particularly, a handheld or otherwise mobile communication device (or user equipment UE) 20 is shown. A mobile communication device is provided with wireless communication capabilities and appropriate electronic control apparatus for enabling operation thereof. Thus the communication device 20 is shown being provided with at least one data processing entity 26, for example a central processing unit, a core processor and/or circuitry, at least one memory 28 and other possible components such as additional processors 25 and memories 29 for use in software and hardware aided execution of tasks it is designed to perform. The data processing, storage and other relevant control apparatus can be provided on an appropriate circuit board 27 and/or in chipsets. Data processing and memory functions provided by the control apparatus of the communication device are configured to cause control and signalling operations in accordance with certain embodiments as described later in this description. A user may control the operation of the communication device by means of a suitable user interface such as touch sensitive display screen or pad 24 and/or a key pad, one of more actuator buttons 22, voice commands, combinations of these or the like. A speaker and a microphone are also typically provided. Furthermore, a mobile communication device may comprise appropriate connectors (either wired or wireless) to other devices and/or for connecting external accessories, for example hands-free equipment, thereto.

The communication device may communicate wirelessly via appropriate apparatus for receiving and transmitting signals. FIG. 1 shows schematically a radio block 23 connected to the control apparatus of the device. The radio block can comprise a radio part and associated antenna arrangement. The antenna arrangement may be arranged internally or externally to the communication device. The antenna arrangement may comprise elements capable of beamforming operations.

The present disclosure relate to mobile communication networks where radio access network functions are split between a central radio access network device and a distributed radio access network device. For example, 5G radio access technology and LTE-A (Long term evolution-advanced) evolution have proposed splitting functions of a base station between a base station distributed unit (BS-DU) and a base station central unit (BS-CU).

Communication networks implementing coordinated multi-point (CoMP) techniques, radio access network load balancing techniques or other cooperative techniques often take into consideration backhaul capability (e.g. capacity of the backhaul or latency of the backhaul). A reason behind this is that in some systems radio access network functionalities may be at least partially distributed (e.g. 4G communication networks). Backhaul capability is relevant in such communication networks for example to manage mobility and handover procedures.

Backhaul capability becomes less relevant in communication networks with centralized and distributed radio access network functionalities (e.g. 5G communication networks). The decreasing relevance may be due to the possibility of implementing time-critical functionalities in the distributed radio access network function and non-time-critical functionalities in the centralized radio access network function. In such communication networks a virtual base station pool of processors may be used to perform the centralized radio access network functionalities. In some scenarios, this may mean that cells can be deployed in a cost efficient manner in the communication network.

The asymmetry of the relation between centralization of radio access network capabilities, backhaul load and the virtual base station pool of processors load may become relevant to manage mobility and cell (re-)selection procedures. Such asymmetry may for example need to be considered in the context of 5G with the cloud-based deployment considerations, the support for new verticals, use cases and/or services. Here new verticals may refer to use cases or deployments that are not traditionally supported using radio access networks—such as smart cities, automated factories, automated vehicles, massive internet of things (IoT), public safety or other which may be supported using the 5G/NR access network. The use cases and/or services that 5G may support may have varying computational complexity requirements. For example, enhanced mobile broadband (eMBB) may focus on providing higher bit rates to the end users, whereas delay sensitive services for factory automation and immersive content provisioning (such as virtual/augmented reality) may require higher computational complexity requirements at the base stations or in the edge cloud. The densification of base stations in 5G may enable multi-connectivity where a single UE is connected to two or more base stations for its communication needs.

In some scenarios, one factor with cloud-based deployments which may need to be taken into consideration may be the availability of computational capacity at the centralized servers where the virtual network functions for the base station processing are located. As compared to systems which are based on dedicated base station hardware, there may be a delinking between conventional considerations for physical resources (e.g. access/physical radio resources or spectrum, backhaul resources and/or the like) in terms of capacity, load and/or achievable latency and considerations for physical resources (e.g. cloud computational resources). The varying cloud computational load in neighbouring radio access network gigabit or next generation nodeBs (gNBs) may be transparent to the end user devices. This may enable different levels of service provisioning.

One or more embodiments may provide techniques to configure and enable mobility management and cell (re-)selection. In contrast to cell selection/re-selection where the availability of the physical resources in the radio access network is taken into account, some embodiments are such that the available computational capacity (e.g. load and/or achievable latency of processing resources) in cloud servers is taken into consideration.

It will be understood that although this disclosure refers to available computational capacity, the unavailable computation capacity and/or the overall computational capacity may alternatively or additionally be considered.

For mobility procedures where neighboring cells may be deployed in the same frequency bands, UEs may measure and report signal strengths and/or quality of the neighboring cells. The neighboring cells may advertise information relating to available computational capacity (averaged or real-time) using system information broadcast or master information broadcast. The available computational capacity may refer to an available amount of processing resources, an available latency of processing resources, available number of cores within a processor that could be used, an available speed of processing resources, an available throughput of processing resources and/or the like.

The neighboring cells may signal such information to the source cell or to other neighboring cells during handover upon requests from the source cell or the other neighboring cells. The neighboring cells may frequently exchange such information over a Xn interface enabling source cells to adapt mobility and load balancing (MLB) functions accordingly. In this way, the UEs may detect and report appropriate neighboring cells which could be potential handover target cells. It will be understood that in this disclosure handover may refer to handing off some or all session flows from a source cell to a target cell.

The MLB may include cell range extension for certain 'attractive' cells (i.e. expanding the coverage area of base station the central unit of which having the greatest available computational capacity). The available computational capacity may make handovers more efficient for the UEs. For example, a cell that is linked to a heavily loaded cloud server may optimize the MLB parameters in order to configure computationally intense devices to handover UEs to nearby cells that are coupled to less loaded cloud servers.

For inter-frequency mobility, the available computational capacity may be a parameter to initiate a measurement object with a UE to search for potentially target cells for handover. With configurable system information broadcast (SIB) in 5G, the network (e.g. gNB-CU) may disable such cell broadcast and discovery information in a gNB-DU when there is not enough available computational capacity available to serve users. Alternatively, in case of high-availability of available computational capacity, the network may configure SIB with a higher periodicity in order to increase the probability of cell detection and access.

For multi-connectivity (i.e. a UE has active session flows with two or more base stations), the selection of appropriate data radio bearers and/or quality of service flows may depend on the computational complexity of a service requested by a UE and computational resource availability.

One or more of the following embodiments may be applicable to initial cell selection and access instead of or as well as mobility and handover procedures.

Figure 2:
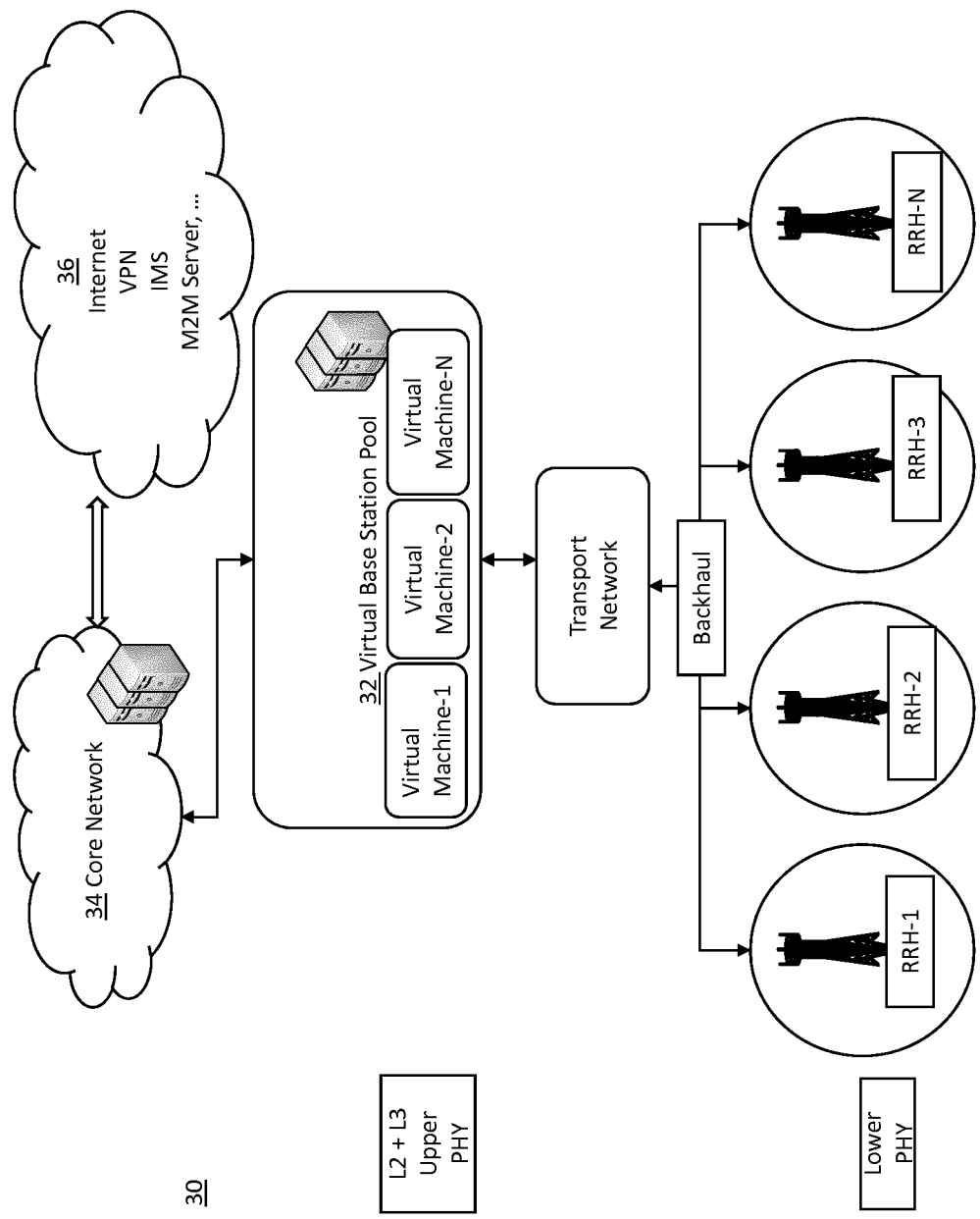
FIG. 2 shows a schematic representation of an example of a communication system according to an embodiment wherein radio access network functions are split in various radio access network devices.

FIG. 2 shows schematically a communication network 30. The communication network comprises a plurality of remote radio heads RRH-1 to RRH-N. The RRH-1 to RRH-N are configured to perform lower layer protocol functionalities. For example, the RRH-1 to RRH-N may be configured to perform lower physical (PHY) layer protocol functionalities. The RRH-1 to RRH-N are connected to a transport network via a backhaul. The RRH-1 to RRH-N may also be referred as base station distributed units (BS-DUs).

The communication network comprises a pool 32 of virtual machines Virtual Machine-1 to Virtual Machine-N. The Virtual Machine-1 to Virtual Machine-N may be implemented within one or more physical equipment such as cloud servers. The Virtual Machine-1 to Virtual Machine-N are configured to perform upper layer protocol functionalities. For example, the Virtual Machine-1 to Virtual Machine-N may be configured to perform upper PHY layer, layer 2 and layer 3 protocol functionalities. The pool 32 of virtual machines Virtual Machine-1 to Virtual Machine-N is connected to the transport network. The pool 32 of virtual machines Virtual Machine-1 to Virtual Machine-N is coupled to the RRH-1 to RRH-N (i.e. each Virtual Machine-X may be associated with one or more respective RRH-X). The pool 32 of virtual machines Virtual Machine-1 to Virtual Machine-N may also be referred as a base station central unit (BS-CU).

The communication network 30 comprises a core network 34 connected to the pool of virtual machines Virtual Machine-1 to Virtual Machine-N. The communication network 30 comprises one or more data networks 36 connected to the core network. The data network 36 may comprise one or more of an internet, a virtual private network (VPN), an internet protocol multimedia subsystem (IMS), a machine to machine (M2M) server and the like.

Figure 3:
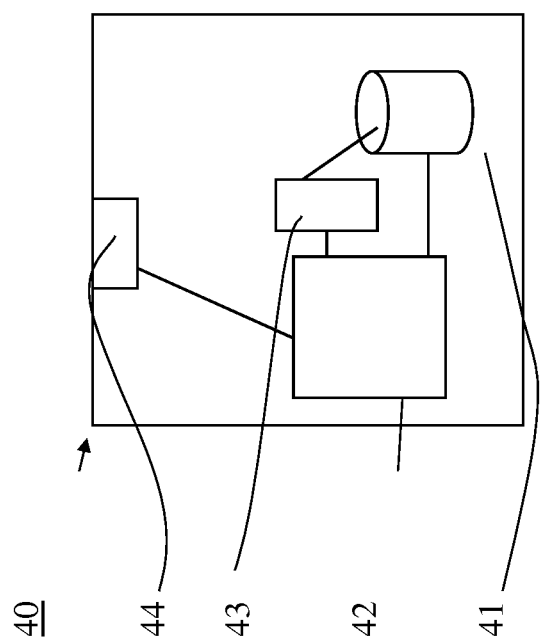
FIG. 3 shows a schematic representation of an example of a central radio access network device, a distributed network device or a core network device according to an embodiment.

FIG. 3 shows an example of a device 40. The device 40 be a central radio access network device or BS-CU. The device 40 may be a distributed radio access device or BS-DU. The device 40 may be a core network device. The device 40 can be arranged to provide control on access, mobility, load balance and/or session flow setup. For this purpose device 40 comprises at least one memory 41, at least one data processing unit or processor 42, 43 and an input/output interface 44. Via the interface the control apparatus can be coupled to relevant other components of the access point. The device 40 can be configured to execute an appropriate software code to provide the control functions.

Figure 4:
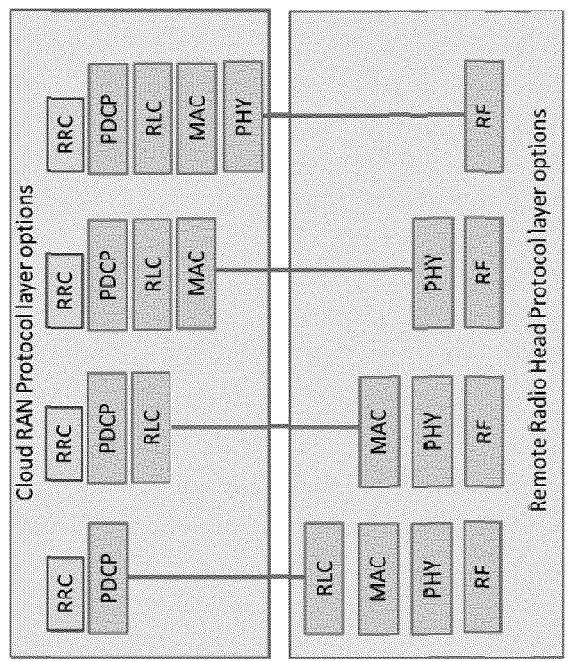
FIG. 4 shows a schematic representation of an example of a protocol layer stack of a base station according to an embodiment wherein radio access network functions are split between a central radio access network device and a distributed radio access network device.

FIG. 4 shows a schematic representation of a protocol layer stack of a base station. The base station comprises a radio frequency (RF) layer, a physical (PHY) layer, a medium access control (MAC) layer, a radio link control (RLC) layer, a packet data convergence protocol (PDCP) layer and a radio resource control (RRC) layer.

In one embodiment, the RF layer, the PHY layer, the MAC layer and the RLC layer may be distributed in a BS-DU and the PDCP layer and the RRC layer may be centralized in a BS-CU.

In another embodiment, the RF layer, the PHY layer and the MAC layer may be distributed in a BS-DU and the RLC layer, the PDCP layer and the RRC layer may be centralized in a BS-CU.

In another embodiment, the RF layer and the PHY layer may be distributed in a BS-DU and the MAC layer, the RLC layer, the PDCP layer and the RRC layer may be centralized in a BS-CU.

In another embodiment, the RF layer may be distributed in a BS-DU and the PHY layer, the MAC layer, the RLC layer, the PDCP layer and the RRC layer may be centralized in a BS-CU.

It will be understood that a communication network may combine one or more of the above embodiments. A communication network may flexibly adopt one or more of the above embodiments depending on real-time network conditions and/or requirements.

Figure 5:
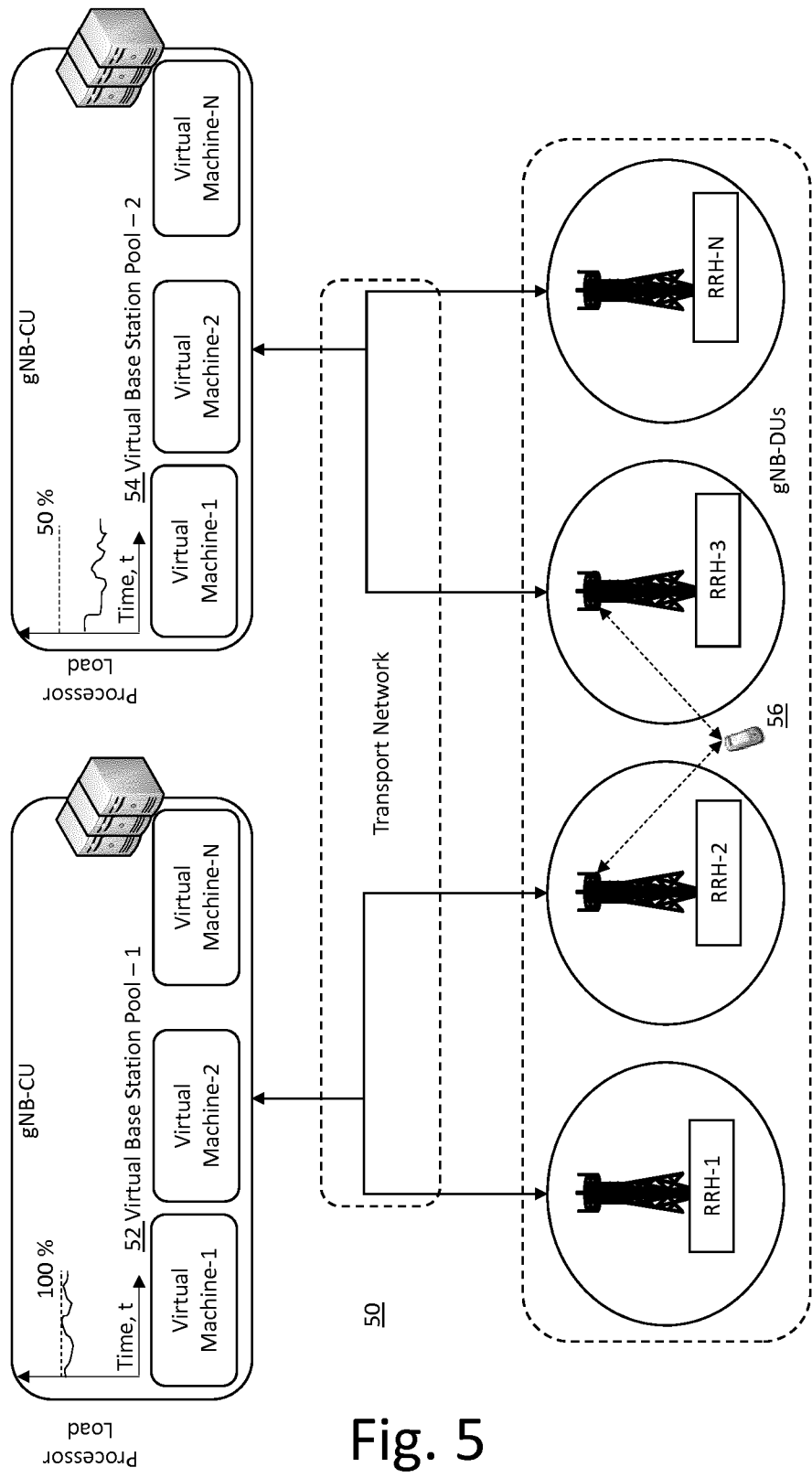
FIG. 5 shows a schematic representation of an example of a communication system according to an embodiment wherein an end user device is at the boundary of distributed radio access network devices.

FIG. 5 shows schematically a communication network 50 comprising a first pool 52 of virtual machines (i.e. Virtual Base Station Pool-1) coupled to RRH-1 and RRH2. The communication network 50 comprises a second pool 54 of virtual machines (Virtual Base Station Pool-2) coupled to RRH-3 and RRH-N. The coupling may depend on the available transport network connectivity options.

A UE 56 may be located at the boundary of both the RRH-2 and RRH-3. For example, the UE 56 is located within the coverage area of both the RRH-2 and RRH-3 and may potentially select, reselect and/or hand over to the RRH-2 or RRH-3.

In a scenario, the first and second pool 52, 54 of virtual machines have different available computational capacity. For example, the load of the processing resources of the first pool of virtual machines is greater (e.g. 100%) than the load of the processing resources of the second pool of virtual machines (e.g. 50%). This may be due to a variation of data processed by the RRH-1 to RRH-N to and from UEs connected thereto. It will be understood that the total and/or available computational capacity of the first and second pool 52, 54 of virtual machines may be adjusted for example by adjusting the number of virtual machines of the first and second pool 52, 54 of virtual machines.

In such scenario, the UE 56 may select, reselect or hand over to the RRH-2 or RRH-3 based on the power and/or quality of a reference signal received from the RRH-2 and RRH-3. Such considerations may work for enhanced Mobile Broadband (eMBB) where the criterion is better signal quality, enabling higher throughputs for the end users. But for specialized services such as ultra-reliable, low-latency communications (URLLC) and immersive content provisioning, the requirements from the access network may not be limited to the availability of physical access network resources or backhaul link capacity/load. It may also include service requirements and the ability of the cloud infrastructure to handle such requirements with acceptable levels of quality of service (QoS).

Figure 6:
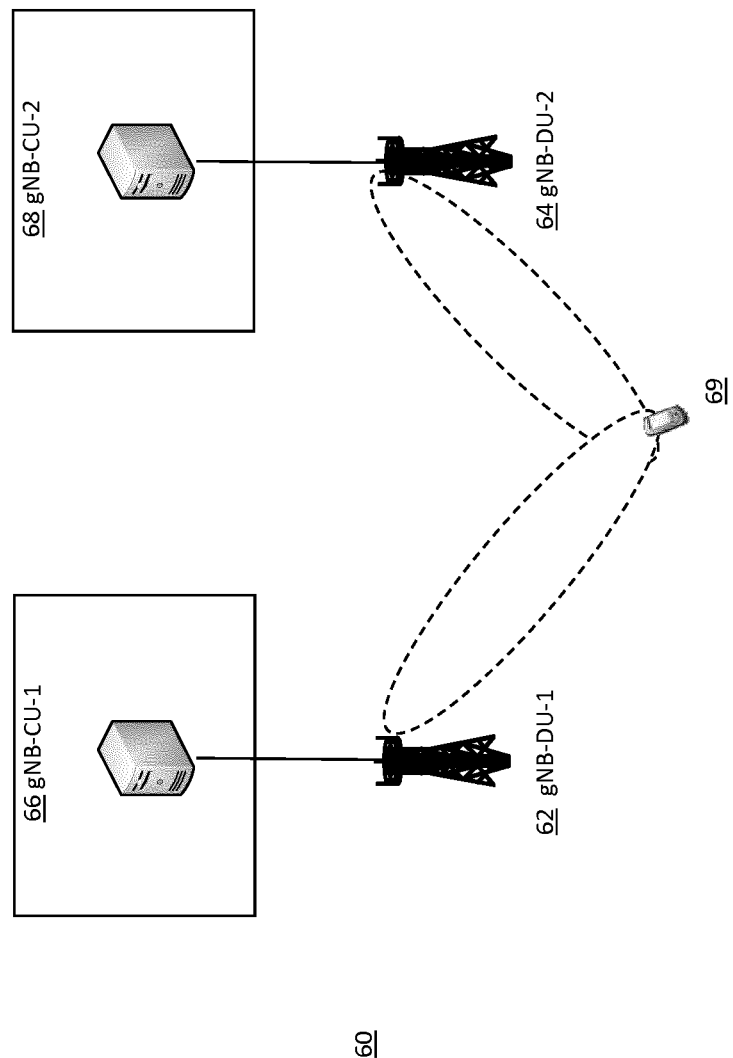
FIG. 6 shows a schematic representation of an example of a communication system according to an embodiment wherein an end user device determines to use a distributed radio access network device based on the computational capacity of a central radio access network device coupled thereto.

Accordingly, in such scenario it may be advantageous to also take the available computational capacity of first and second pools 52, 54 of virtual machines into consideration to manage access and mobility. It may alternatively or additionally be advantageous to take the service requirement of the UE 56 (e.g. in terms of edge caching and processing) into consideration to manage access and mobility FIG. 6 shows schematically a communication network 60. The communication network 60 comprises a first BS-DU 62 (e.g. gNB-DU-1) and a second BS-DU 64 (e.g. gNB-DU-2) respectively coupled to a first BS-CU 66 (e.g. gNB-CU-1) and a second BS-CU 68 (e.g. gNB-CU-2). The available computational capacity of the first BS-CU may be lower than the available computational capacity of the second BS-CU.

A UE 69 may be at the boundary of both the first BS-DU 62 and the second BS-DU 64. The first BS-DU 62 may be a source cell and the second BS-DU 64 may be a target cell (e.g. the UE is already served by the first BS-DU). Alternatively, both the first BS-DU 62 and the second BS-DU 64 may be target cells (e.g. the UE 69 is not served by the first BS-DU 62 or the second BS-DU 64) or source cells (e.g. the UE 69 is served by both the first BS-DU 62 or the second BS-DU 64).

The first BS-DU 62 and the second BS-DU 64 may operate on the same carrier and/or on separate carriers.

In operation, the first BS-CU 66 may determine its available computational capacity and may transmit its available computational capacity to the first BS-DU 62 to be advertised. Likewise, the second BS-CU 68 may determine its available computational capacity and may transmit its available computational capacity to the second BS-DU 64 to be advertised. The available computational capacity of the first BS-CU 66 and/or the available computational capacity of the second BS-CU 68 may be advertised along with other radio parameters. For example, the available computational capacity of the first BS-CU 66 and/or the available computational capacity of second BS-CU 68 may be advertised as part of a system information block (SIB) or a master information block (MIB).

The UE 69 may receive the available computational capacity of the first BS-CU 66 and/or the second BS-CU 68.

In an embodiment, the UE 69 may compare the available computational capacity of the first BS-CU 66 and the second BS-CU and may determine whether to select, reselect or hand over to the first BS-DU 62 or the second BS-DU 64 based thereon. For example, the UE 69 may determine to select, reselect or hand over to the first BS-DU 62 rather than the second BS-DU 64 if the available computational capacity of the first BS-CU 66 is greater than the available computational capacity of the second BS-CU 68.

The UE 69 may alternatively or additionally determine a quality of service, a computational complexity, and/or other service parameter/metric/characteristic of a service requested by the UE 69. The UE 69 may determine whether the available computational capacity of the first BS-CU 66 or the second BS-CU 68 is sufficient to meet the quality of service and/or a computational complexity. The UE 69 may determine to select, reselect or hand over to the first BS-DU 62 or the second BS-DU 64 if the available computational capacity of the first BS-CU 66 or the second BS-CU 68 is sufficient to meet the quality of service, a computational complexity and/or other service parameter/metric/characteristic of the service requested by the UE 69.

In another embodiment, the UE 69 may report a result of the comparison between the available computational capacity of the first BS-CU 66 and the second BS-CU 68 to the first BS-DU 62 in a measurement report. The first BS-DU 62 or second BS-DU 64 may determine whether the UE 69 should select, reselect or hand over to the first BS-DU 62 or the second BS-DU 64 based thereon. For example, the first BS-DU 62 may determine that the UE 69 should select, reselect or hand over to the first BS-DU 62 rather than the second BS-DU 64 if the available computational capacity of the first BS-CU 66 is greater than the available computational capacity of the second BS-CU 68.

The first BS-DU 62 may determine a quality of service, a computational complexity and/or other service parameter/metric/characteristic of a service requested by the UE 69. The first BS-DU 62 may determine whether the available computational capacity of the first BS-CU 66 is sufficient to meet the quality of service, a computational complexity and/or other service parameter/metric/characteristic. The first BS-DU 62 may determine that the UE 69 should select, reselect or hand over to the first BS-DU 62 if the available computational capacity of the first BS-CU 66 is sufficient to meet the quality of service, a computational complexity and/or other service parameter/metric/characteristic.

In another embodiment, the UE 69 may report the available computational capacity of the second BS-CU 68 to the first BS-DU 62 in a measurement report. The first BS-DU 62 may determine whether the UE 69 should select, reselect or hand over to the first BS-DU 62 or the second BS-DU 64 based thereon. For example, the first BS-DU 62 may determine that the UE 69 should select, reselect or hand over to the first BS-DU 62 rather than the second BS-DU 64 if the available computational capacity of the first BS-CU 66 is greater than the available computational capacity of the second BS-CU 66.

The first BS-DU may determine a quality of service, a computational complexity and/or other service parameter/metric/characteristic of a service requested by the UE 69. The first BS-DU 62 may determine whether the available computational capacity of the first BS-CU 66 is sufficient to meet the quality of service, a computational complexity and/or other service parameter/metric/characteristic. The first BS-DU 62 may determine that the UE 69 should select, reselect or hand over to the first BS-DU 62 if the available computational capacity of the first BS-CU 66 is sufficient to meet the quality of service, a computational complexity and/or other service parameter/metric/characteristic.

In another embodiment, the first BS-DU 62 may forward the measurement report received from the UE 69 to the first BS-CU 66 and the first BS-CU 66 may determine whether the UE 69 should select, reselect or hand over to the first BS-DU 62.

In an embodiment, the measurement report received by the first BS-DU 62 from the UE 69 may comprise an identifier of the first BS-DU 62 (e.g. cell ID) and a measurement of a reference signal transmitted by the first BS-DU 62 (e.g. reference signal received power and/or a reference signal received quality). Likewise, the measurement report received by the first BS-DU 62 from the UE may comprise an identifier of the second BS-DU 64 (e.g. cell ID) and a measurement of a reference signal transmitted by the second BS-DU 64 (e.g. absolute and/or relative value, reference signal received power and/or reference signal received quality). The measurement report may be transmitted in an uplink dedicated control channel (UP-DCCH).

A portion of computer program showing an example of a measurement report is reproduced below.

```
measresults-extX: measresults-extX ::= {
        measResultCompCap-r1Y: MeasResultCompCap-r1Y ::= {
              MeasResultCompCap-r1Y ::= {
                                measResultBestNeighCell-r1Y:
                                measResultBestNeighCell-r1Y ::=
                                {
                                    physCellId-r1Y: 284
                                    rsrpResultNCell-r1Y: 26
                                    rsrqResultNCell-r1Y: 19
                                    CompCapResultNCell-r1Y:
                                    19
                                }
                  }
           }
    }
```

In this example, the physical cell identifier of a best neighbouring cell is '284', the reference signal received power for the best neighbouring cell is '26', the reference signal received quality for the best neighbouring cell is '19' and the result of the comparison between the available computation capacity of a serving cell and the available computation capacity of the best neighbouring cell is '19'.

It will be understood that the measurement report may take other suitable forms.

It will be understood that the communication network 60 may combine one or more of the above embodiments.

In other words, in a communication network with centralized and distributed base station functions, the base stations may advertise their available computational capacity along with other radio parameters. The UE, upon receiving the information, may determine whether the advertised capacity is sufficient for serving the UE. Alternatively or additionally, the UE may use a measurement report to signal the total and/or available computational capacity of a target cell along with the signal strength and other information to the source cell. Based on the measurement report, the source cell may determine whether to initiate handover based on the requirements of the active service flows for the UE. Similar parameterization could be also used for cell selection and access, in order to determine the appropriate cell for connectivity.

Figure 7:
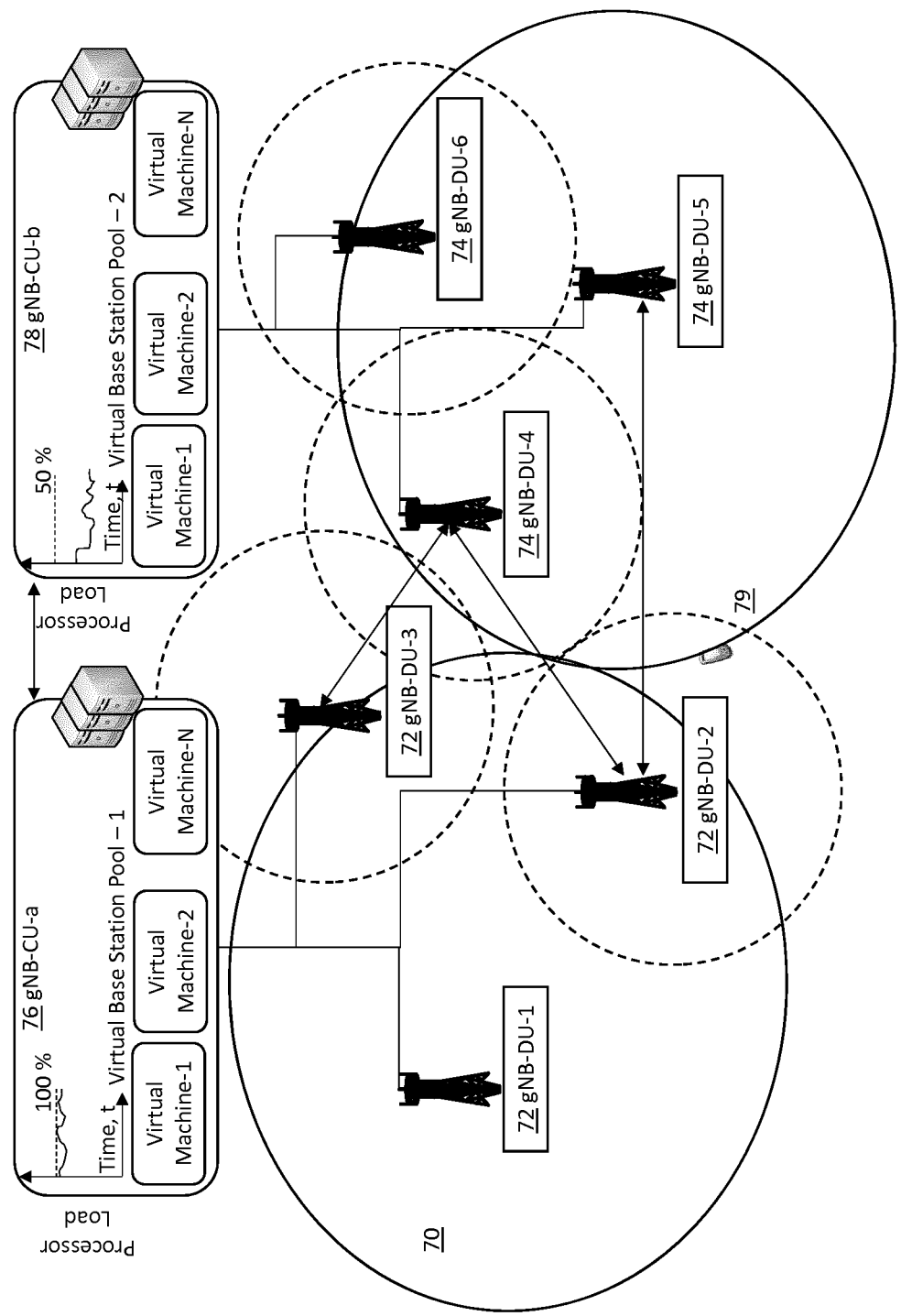
FIG. 7 shows a schematic representation of an example of a communication system according to an embodiment wherein a distributed or central radio access network device determines to use a distributed radio access network device based on the computational capacity of a central radio access network device coupled thereto.

FIG. 7 shows schematically a communication network 70 comprising first BS-DUs 72 (e.g. gNB-DU-1 to gNB-DU-3) coupled to a first BS-CU 76 (e.g. gNB-CU-a). The communication network 70 also comprises second BS-DUs 74 (e.g. gNB-DU-4 to gNB-DU-6) coupled to a second BS-CU 78 (e.g. gNB-CU-b).

Some of the first BS-DUs 72 may be wider area BS-DUs (e.g. gNB-DU-1) whilst others may be smaller area BS-DUs (e.g. gNB-DU-2 and gNB-DU-3). Likewise, some of the second BS-DUs 74 may be wider area BS-DUs (e.g. gNB-DU-5) whilst others may be smaller area BS-DUs (e.g. gNB-DU-4 and gNB-DU-6). The available computational capacity of the first BS-CU 76 may be lower than the available computational capacity of the second BS-CU 78.

The first BS-CU 76 and the second BS-CU 78 have different levels of computational loads. The difference may be due to the UEs 79 distribution and related radio resource utilization. The difference may also be due to the computational complexity for serving a quality of service of a service requested by the UEs 79.

In one embodiment, one of the first BS-DUs 72 may receive (e.g. periodically or in response to an event) the available computational capacity of the second BS-CU 78, a radio resource utilization and/or a computational complexity for serving a a quality of service of a service requested by a UE 79 from a second BS-DU 74. The second BS-DU 74 may be a neighbouring second BS-DU, a second BS-DU causing interference to the first BS-DU 72 and/or a second BS-DU undergoing interference from the first BS-DU 72. The first BS-DU 72 may then manage access, mobility and/or load balance based thereon. That is, access, mobility and load balance may be managed in a distributed manner.

In another embodiment, the first BS-CU 76 may receive the available computational capacity of the second BS-CU 78, a radio resource utilization and/or a computational complexity for serving a quality of service of a service requested by a UE 79 from a second BS-DU 74. The first BS-CU 78 may then manage access, mobility and load balance based thereon. That is, access, mobility and load balance may be managed in a centralised manner.

The first BS-CU 76 may also receive feedback from the first BS-DUs 72 and/or the second BS-DUs 74 to optimize access, mobility and load balance for the overall network and provide the best performance.

Figure 8:
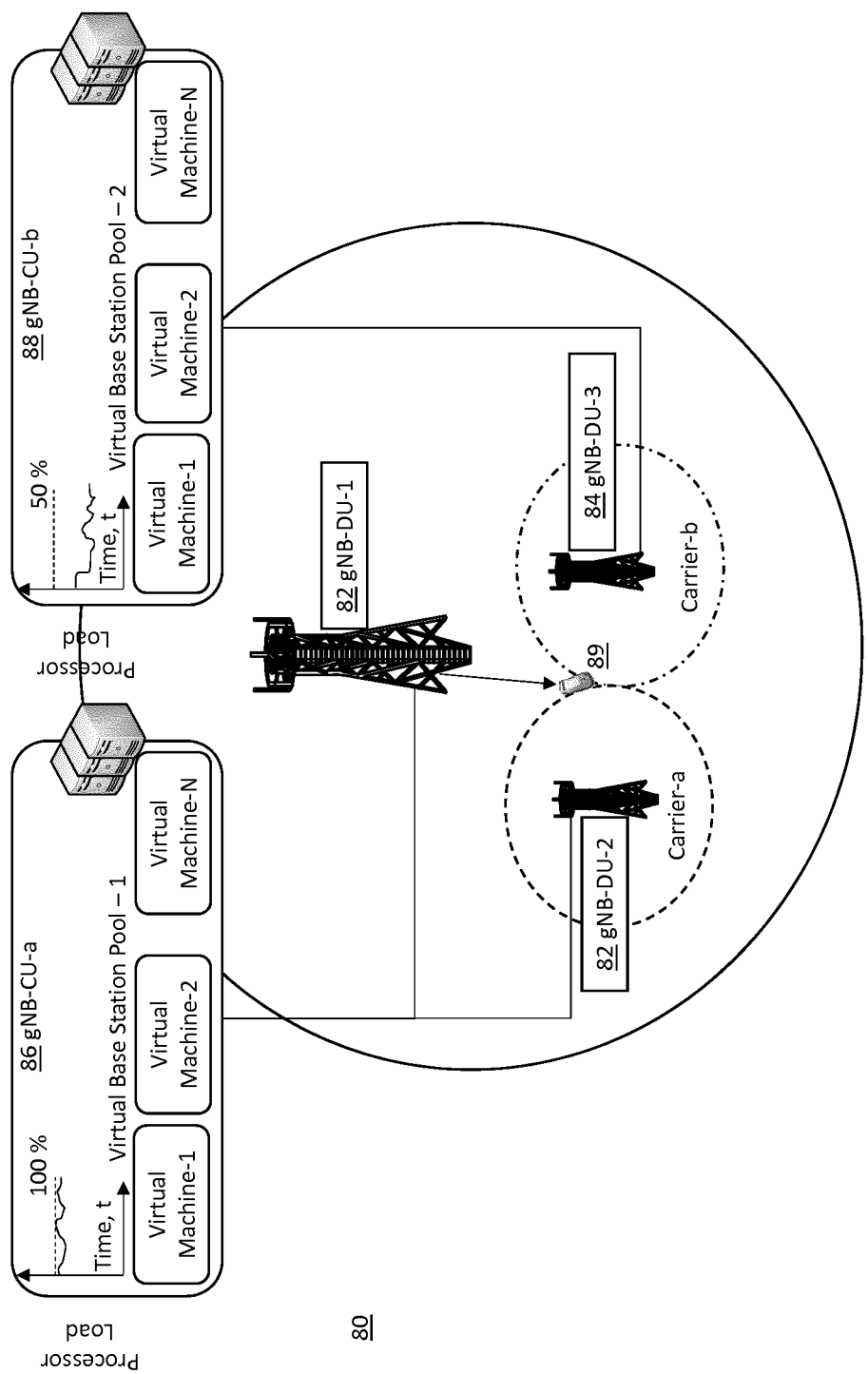
FIG. 8 shows a schematic representation of an example of a communication system according to an embodiment wherein an end user device is at the boundary of various radio access network devices operating on different carriers.

FIG. 8 shows schematically a communication network 80 comprising first BS-DUs 82 (e.g. gNB-DU-1 and gNB-DU-2) and a second BS-DU 84 (e.g. gNB-DU-3) respectively coupled to a first BS-CU 86 (e.g. gNB-CU-a) and a second BS-CU 88 (e.g. gNB-CU-b). Some of the first BS-DUs 82 (e.g. gNB-DU-1) may be wider coverage area BS-DUs 82 whereas others (e.g. gNB-DU-2) may be smaller coverage area BS-DUs. Likewise, some of the second BS-DUs 84 may be wider coverage area BS-DUs whereas others (e.g. gNB-DU-3) may be smaller coverage area BS-DUs. The available computational capacity of the first BS-CU 86 may be lower than the available computational capacity of the second BS-CU 88.

A UE 89 may be located at the boundary of a first BS-DU 82 (e.g. gNB-DU-2) and a second BS-DU 84 (e.g. gNB-DU-3). Here, the first BS-DU 82 and the second BS-DU 84 may operate one separate carriers (e.g. carrier a and carrier b). The first BS-DU 82 may be a source cell and the second BS-DU may be a target cell.

In an embodiment, the first BS-DU 82 may configure the UE 89 to measure carrier b in order to increase the probability to discover a second BS-DU 84 coupled to the second BS-CU 88 (which has a greater available computational capacity than the first BS-CU 86). More specifically, the first BS-DU 82 may configure the UE 89 to measure carrier b based on a comparison between the available computational capacity of the first BS-CU 86 and the available computational capacity of the second BS-CU 88. For example, if the available computational capacity of the first BS-CU 86 is greater than the available computational capacity of the second BS-CU 88 the first BS-DU 82 may not configure the UE 89 to measure carrier b to save power. By contrast, if the available computational capacity of the first BS-CU 86 is lower than the available computational capacity of the second BS-CU 88 the first BS-DU 82 may not configure the UE 89 to measure carrier b to ensure that the service requested by the UE may be served in the best possible manner.

Figure 9:
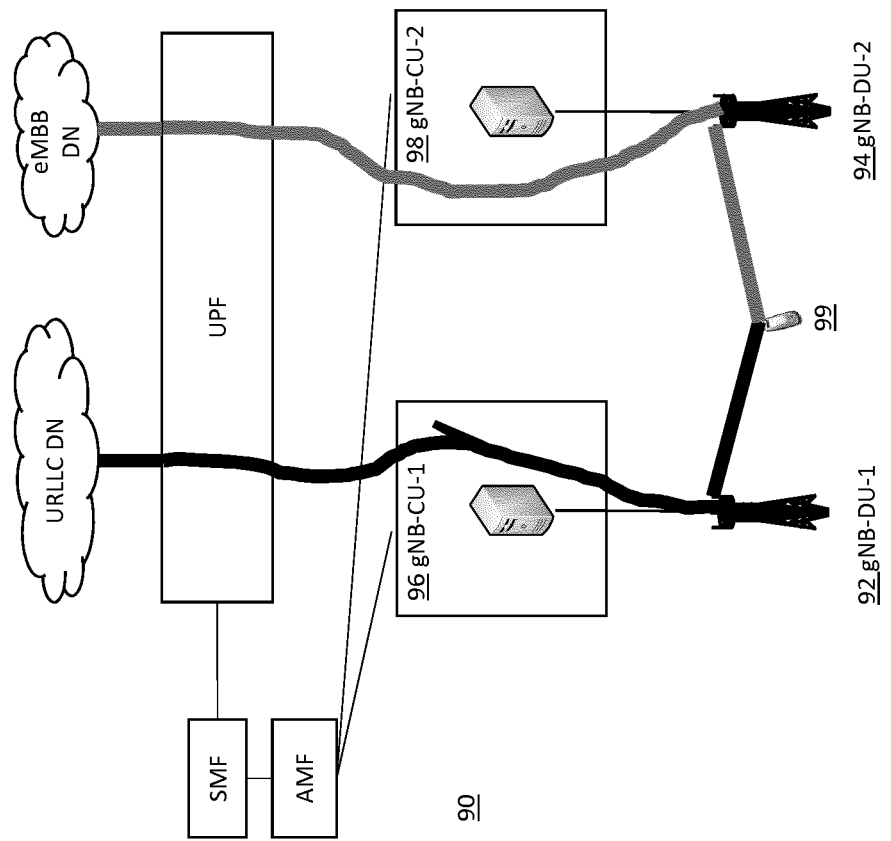
FIG. 9 shows a schematic representation of an example of a communication system according to an embodiment wherein an end user device is connected to multiple distributed radio access network devices coupled to central radio access network devices.

FIG. 9 shows schematically a communication network 90 comprising a first BS-DU 92 (e.g. gNB-DU-1) and a second BS-DU 94 (e.g. gNB-DU-2) respectively coupled to a first BS-CU 96 (e.g. gNB-CU-1) and a second BS-CU 98 (e.g. gNB-CU-2). The available computational capacity of the first BS-CU 96 may be lower than the available computational capacity of the second BS-CU 98.

The communication network 90 comprises a core network. The core network may comprise a user plane function (UPF), an access and mobility management function (AMF) and a session management function (SMF).

The AMF may be configured to set up a session flow between the UE 99 and a data network via the first BS-DU 92 coupled to the first BS-CU 96 or via the second BS-DU 94 coupled to the second BS-CU 98 based on the available computational capacity of the first BS-CU 96 and the available computational capacity of the second BS-CU 98. The data network may comprise an ultra-reliable low-latency communication data network (URLLC DN) and an enhanced mobile broadband data network (eMBB DN). It will be understood that the communication network 90 may comprise other data networks.

The UE 99 may be subscribe to both (1) a high-priority, high-computational complexity ultra-reliable low-latency communication (URLLC) service and (2) a low-priority, low-computational complexity extreme mobile broadband (eMBB) service. The UE may have multi-connectivity with the first BS-DU and the second BS-DU.

The AMF may set up a session flow between the UE 99 and the URLLC DN and another session flow between the UE 99 and the eMBB DN based on the available computational capacity of the first BS-CU 96 and the available computational capacity of the second BS-CU 98. For example, the first BS-CU 96 may have a higher available computational capacity and therefore may be suitable for serving a URLLC flow. Thus, the AMF may set up a session flow between the UE 99 and the URLLC DN via the first BS-DU 92 and the first BS-CU 96. Likewise, the second BS-CU 98 may have a lower available computational capacity but may still be able to handle an eMBB session flow. Thus, the AMF may set up a session flow between the UE 99 and the eMBB DN via the second BS-DU 94 and the second BS-CU 98. To allow this, specific signalling may be exchanged between the AMF, the first BS-CU 96 and the second BS-CU 98.

Figure 10:
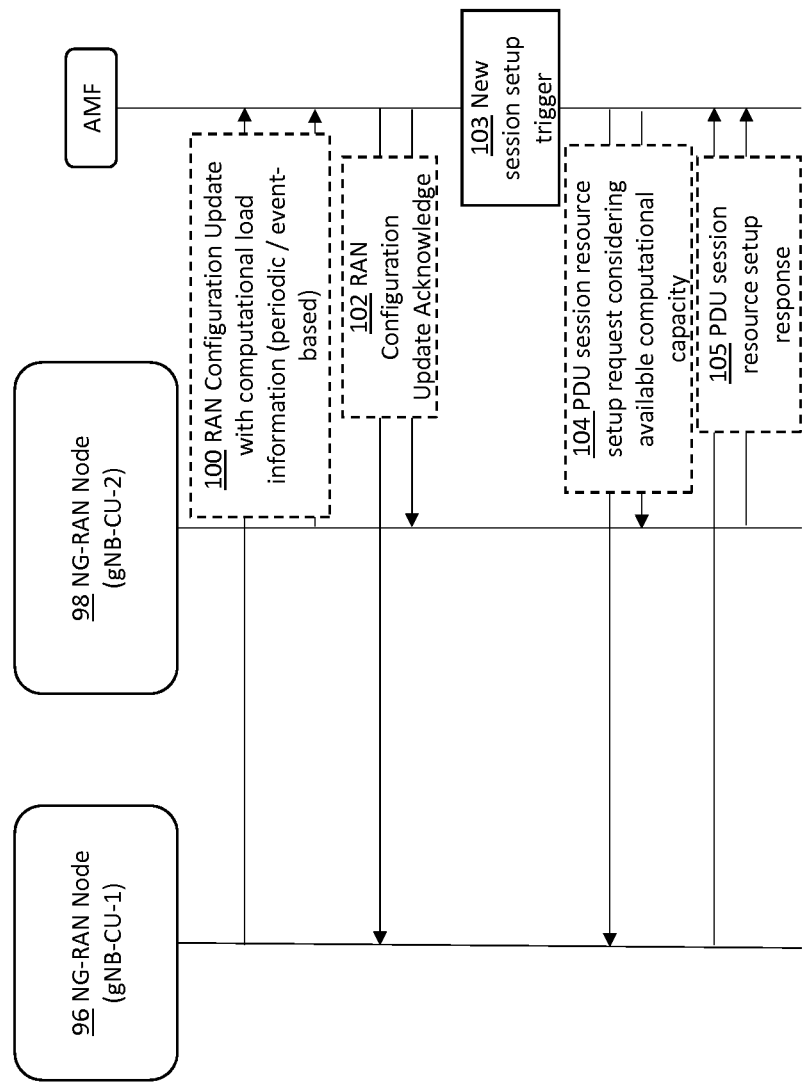
FIG. 10 shows a schematic representation of a diagram of an example of a method according to an embodiment to establish session flows between an end user device and a data network via distributed and central radio access network devices.

FIG. 10 shows schematically a diagram of a method performed by the AMF. It will be understood the method could alternatively or additionally be performed by another function in the core network.

In this embodiment, the AMF may proactively map session flows that require higher computational load to appropriate BS-CUs that can handle such loads. The enhanced radio access network configuration update procedure (as defined in TS 38.413) may be incorporated by reference. In this embodiment, new generation access point (NG-AP) messages (as defined in TS 38.413) may be/modified to support information elements (IEs) to exchange available computational capacity information either periodically and/or based on configured events (e.g. load below/above certain limit). Based on this information being available at the AMF, appropriate flows may be setup using appropriate BS-CUs using a packet data unit PDU session resource setup procedure.

In step 100, the AMF receives a radio access network configuration update from the first BS-CU 96 comprising an available computational capacity of the first BS-CU 96. Likewise, the AMF receives a configuration update from the first BS-CU 96 comprising an available computational capacity of the second BS-CU 98. The reception may be periodical or event based.

In step 102, the AMF transmits a radio access network configuration update acknowledgement to the first BS-CU 96. Likewise, the AMF transmits a radio access network configuration update acknowledgement to the second BS-CU 98.

In step 103, the AMF triggers a new session setup. For example, the AMF triggers a URLLC session flow and an eMBB session flow.

In step 104, the AMF determines that the first BS-CU 96 has a higher available computational capacity and therefore may be ideal for serving the URLLC flow. Thus, the AMF may set up a session flow between the UE 99 and the URLLC DN via the first BS-DU 92 and the first BS-CU 96. Likewise, the AMF determines that the second BS-CU 98 may have a lower available computational capacity but may still be able to handle an eMBB session flow. Thus, the AMF may set up the session flow between the UE 99 and the eMBB DN via the second BS-DU 94 and the second BS-CU 98.

In step 105, the AMF receives a PDU session resource setup response from the first BS-CU 96. Likewise, the AMF receives a PDU session resource setup response from the second BS-CU 98.

Figure 11:
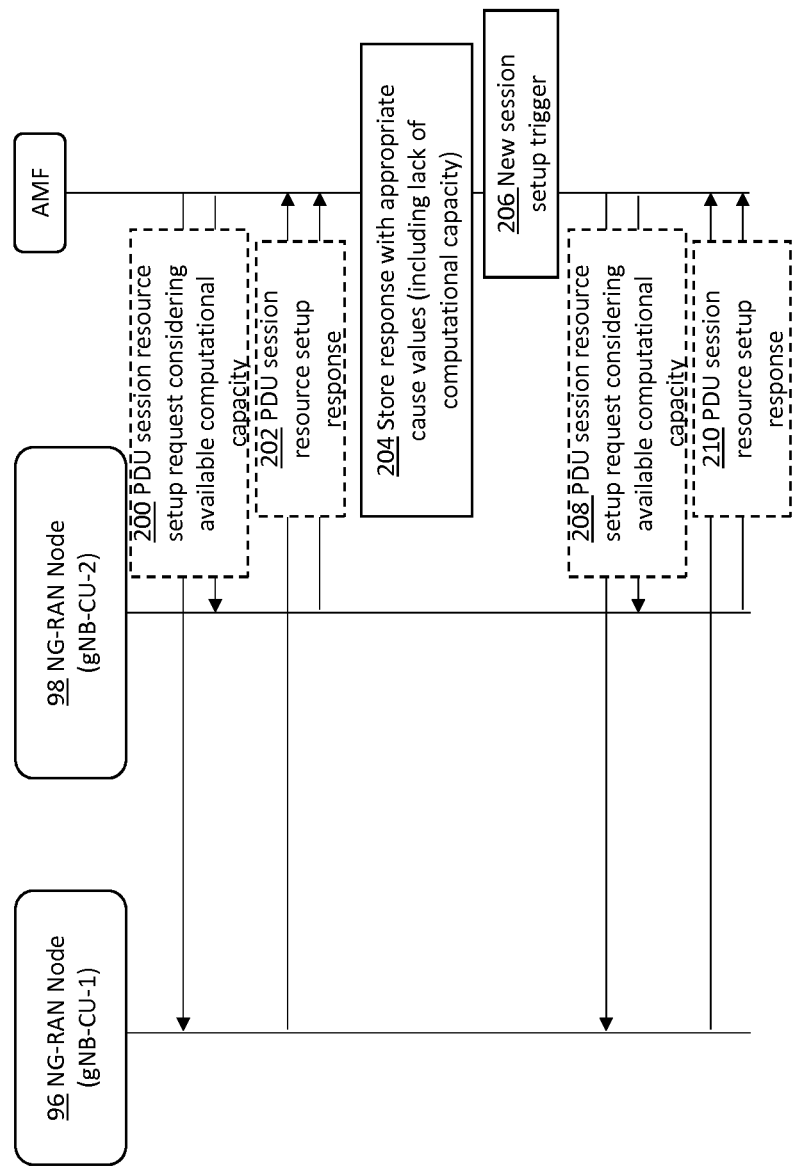
FIG. 11 shows a schematic representation of a diagram of an example of a method according to an embodiment to establish session flows between an end user device and a data network via distributed and central radio access network devices.

FIG. 11 shows schematically a diagram of a method performed by the AMF. It will be understood the method may be performed by another function of the core network.

In this embodiment, the AMF may reactively map flows that require higher computational load to appropriate BS-CUs based on the response received from the BS-CUs in prior PDU resource setup procedures. In this embodiment, the AMF may create a per BS-CU state machine to keep track of past PDU session resource setup procedure responses to reactively allocate new session flows to appropriate BS-CUs. This embodiment may also require information elements in the PDU session resource setup response to indicate the reason for rejecting the request which may include lack of available computational capacity.

In step 200, the AMF transmits a PDU session resource setup request considering the available computational capacity of the first BS-CU 96 to the first BS-CU 96 (e.g. as described in step 104). Likewise, the AMF transmits a PDU session resource setup request considering the available computational capacity of the second BS-CU 98 to the second BS-CU 98.

In step 202, the AMF receives a PDU session resource setup response from the first BS-CU 96 (e.g. as described in step 105). Likewise, the AMF receives a PDU session resource setup response from the second BS-CU 98. Each PDU session resource setup response may comprise a cause value providing reasons for accepting or rejecting the request (e.g. a lack of available computational capacity).

In step 204, the AMF stores the PDU session resource setup response from the first BS-CU 96 and the second BS-CU 98 with appropriate cause values.

In step 206, the AMF triggers a new session setup. For example, the AMF triggers a URLLC session flow and an eMBB session flow.

In step 208, the AMF may determine that the first BS-CU 96 has a higher available computational capacity based on the PDU session resource setup response stored in step 204 and therefore may be suitable for serving the URLLC flow. Thus, the AMF may set up a session flow between the UE 99 and the URLLC DN via the first BS-DU 92 and the first BS-CU 96.

Likewise, the AMF may determine that the second BS-CU 98 may have a lower available computational capacity based on the PDU session resource setup response stored in step 204 but may still be able to handle an eMBB session flow. Thus, the AMF may setup the session flow between the UE 99 and the eMBB DN via the second BS-DU 94 and the second BS-CU 98.

Figure 12:
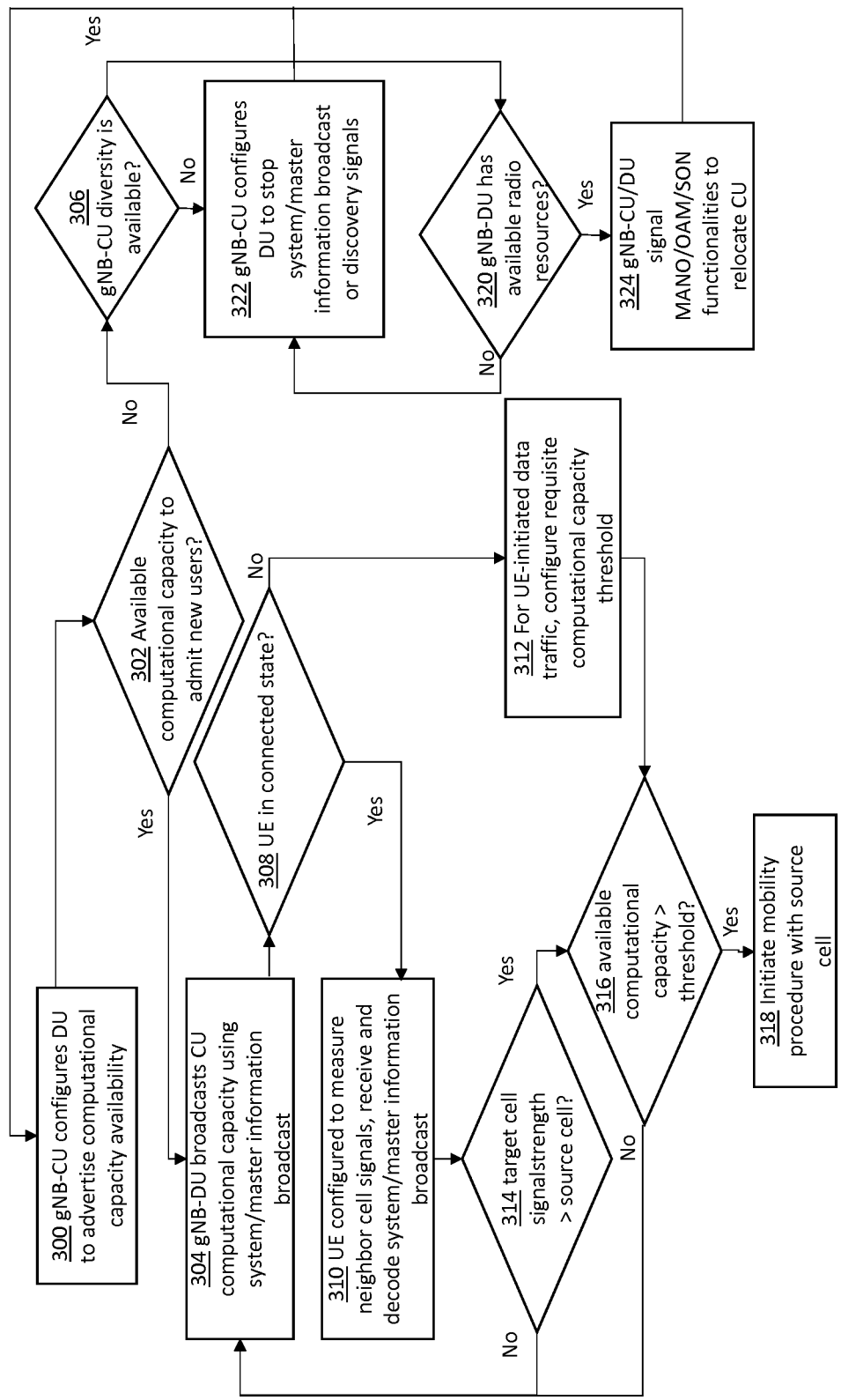
FIG. 12 shows a schematic representation of a diagram of an example of a method according to an embodiment to manage mobility of an end user device.

FIG. 12 shows schematically a diagram of a method performed in a communication network according to an embodiment.

In this embodiment, due to the uncorrelated behaviour of the available computational capacity of the BS-CU and radio resources of the BS-DU, the available computational capacity of the BS-CU may have priority when managing mobility. The network deployment considers potential diversity in terms of the available BS-CUs for a BS-DU. There may also be BS-CU relocation in the event that a BS-CU does not have available computational capacity but a BS-DU coupled to the BS-CU has available radio resources. The UE measurement, mobility behaviour and/or the cell discovery behaviour may be configured depending on the available computational capacity BS-CU to process user data traffic.

In step 300, a BS-CU configures a BS-DU coupled thereto to advertise the available computational capacity of the BS-CU. The BS-CU may use F1 interface signalling enhancements and/or other suitable signalling. The method goes to step 302.

In step 302, the BS-DU determines whether the BS-CU has available computational capacity to serve UEs. If the BS-CU has available computational capacity to serve UEs the method goes to step 304. If the BS-CU does not have available computational capacity to serve UEs, the method goes to step 306.

In step 304 (i.e. the BS-CU has available computational capacity to serve additional UEs), the BS-DU broadcasts the available computational capacity of the BS-CU. For example, the BS-DU broadcasts the available computational capacity of the BS-CU using system information block (SIB) or master information block (MIB). Also, the BS-DU broadcasts a reference signal. The method goes to step 308.

In step 308, the UE determines whether it is in connected state or in idle state. It the UE is in connected state, the method goes to step 310. If the UE is in idle state the method goes to step 312.

In step 310 (i.e. the UE is in connected state), the UE, which is configured to monitor neighboring cell signals, receives and measures the reference signal from the BS-DU. The UE may receive and decode the SIB or MIB from the BS-DU. The method goes to step 314.

In step 314, the UE determines whether the signal strength and/or quality of the BS-DU is greater than the signal strength and/or quality of a source BS-DU. If the signal strength and/or quality of the BS-DU is better than the signal strength and/or quality of a source BS-DU the method goes to step 316. If the signal strength and/or quality of the BS-DU is not better than the signal strength and/or quality of a source BS-DU, the method loops back to step 304.

In step 316 (i.e. the signal strength and/or quality of the BS-DU is greater than the signal strength and/or quality of a source BS-DU), the UE determines whether the available computational capacity of the BS-DU is greater than an available computational capacity threshold. If the available computational capacity of the BS-DU is greater than the available computational capacity threshold the method goes to step 318. If the available computational capacity of the BS-DU is not greater than the available computational capacity threshold the method loops back to step 304.

In step 318, the UE initiate a mobility procedure with the source BS-DU.

In step 312 (i.e. the UE is in idle state), the UE is configured with an available computational capacity threshold for UE initiated data traffic. The method goes to step 316.

In step 306 (i.e. the BS-CU does not have available computational capacity to serve additional UEs), the BS-CU determines whether another BS-CU has available computational capacity. If another BS-CU has available computational capacity, the method goes to step 320. If no other BS-CU has available computational capacity, the method goes to step 322.

In step 320 (i.e. another BS-CU has available computational capacity), the BS-DU determines whether it has available radio resource. If the BS-DU has available radio resources the method goes to step 324. If the BS-DU has available radio resources the method goes to step 322.

In step 322 (i.e. no other BS-CU has available computational capacity OR another BS-CU has available computational capacity but the BS-DU does not have available radio resources), the BS-CU configures the BS-DU to stop broadcasting the SIB, MIB and/or the reference signal. The method loops back to step 300.

In step 324 (i.e. another BS-CU has available computational capacity and the BS-DU has available radio resources), the BS-DU is coupled to the other BS-CU. The BS-CU and/or the BS-DU may signal a management and orchestration (MANO), an operations and management (OAM) and/or a self-organizing network (SON) function to relocate the BS-CU. In this way, the use of network resources may be optimized.

Figure 13:
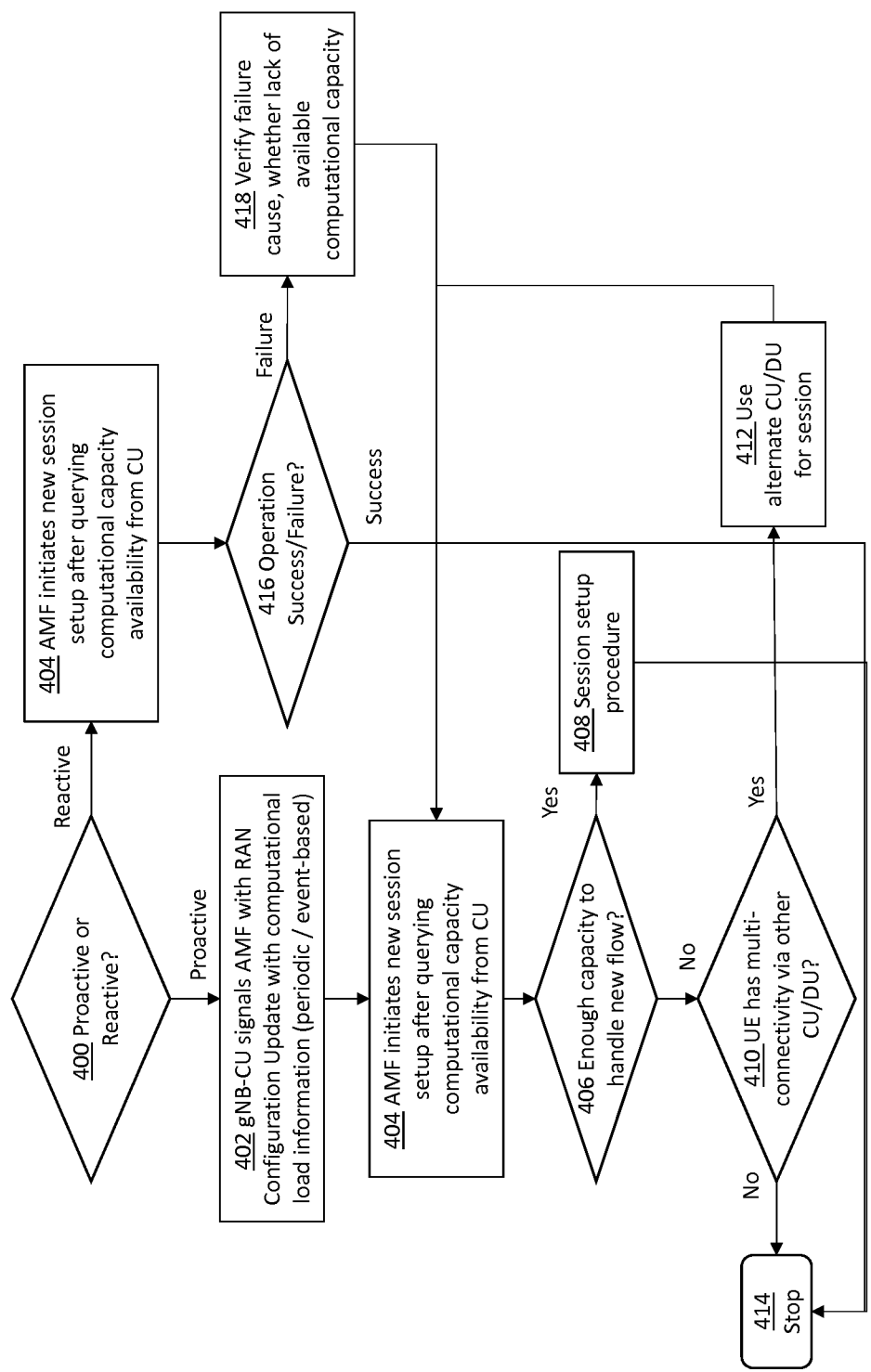
FIG. 13 shows a schematic representation of a diagram of an example of a method according to an embodiment to route session flows of an end user device.

FIG. 13 shows schematically a diagram of a method performed in a communication network according to an embodiment. The method may be performed by the AMF but it will be understood that it could be equally performed by other another function of the core network.

In step 400, the AMF determines whether to operate in a proactive mode of operation (as discussed in reference to FIG. 10) or in a reactive mode of operation (as discussed in reference to FIG. 11). If the AMF operates in a proactive mode of operation the method goes to step 402. If the AMF operates in a reactive mode of operation the method goes to step 404.

In step 402 (i.e. the AMF operates in a proactive mode of operation) the AMF receives a radio access network configuration update from a BS-CU comprising an available computational capacity of the BS-CU. The reception may be periodical or event based. The AMF may transmit a radio access network configuration update acknowledgement to the BS-CU. The method goes to step 404.

In step 404, the AMF initiates a new session setup. The method goes to step 406.

In step 406, the AMF determines whether the BS-CU has enough available computational capacity to handle a session flow. If the BS-CU has enough available computational capacity to handle a session flow the method goes to step 408. If the BS-CU does not have enough available computational capacity to handle a session flow the method goes to step 410.

In step 408 (i.e. the BS-CU has enough available computational capacity to handle a session flow), the AMF proceeds with the session setup procedure. The AMF is transmits a PDU session resource setup request to the BS-CU. Then, the AMF receives a PDU session resource setup response from the BS-CU.

In step 410 (i.e. the BS-CU does not have enough available computational capacity to handle a session flow), the AMF determines whether the UE has multi-connectivity with another BS-CU coupled to another BS-DU. If the UE has multi-connectivity with another BS-CU coupled to another BS-DU the method goes to 412. If the UE does not have multi-connectivity with another BS-CU coupled to another BS-DU the method goes to 414.

In step 412 (i.e. the UE has multi-connectivity with another BS-CU coupled to another BS-DU), the AMF switches to the BS-CU coupled to the BS-DU to initiate a new session setup and loops back to step 404.

In step 414 (i.e. the UE does not have multi-connectivity with another BS-CU coupled to another BS-DU), the AMF does not transmit a PDU session resource request to the BS-CU and the method is stopped.

In step 404 (i.e. the AMF operates in a reactive mode of operation) the AMF initiates a new session setup. The AMF transmits a PDU session resource setup request to the BS-CU. Then, the AMF receives a PDU session resource setup response from the BS-CU indicating whether the PDU session resource request is accepted or refused. The method goes to step 416.

In step 416, the AMF determines whether the PDU session resource setup request is accepted (i.e. success) or rejected (i.e. failure). If the PDU session resource setup request is accepted, the AMF stores the PDU session resource setup response and goes to step 414. If the PDU session resource setup request is rejected, the AMF stores the PDU session resource setup response and goes to step 418.

In step 418 (i.e. the PDU session resource setup request is rejected), the AMF verifies the cause for rejecting the PDU session resource setup request and goes to step 404.

Figure 14:
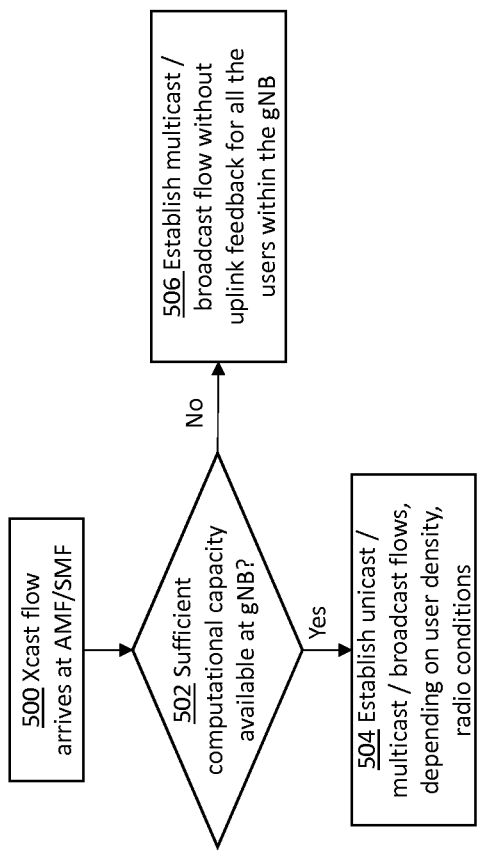
FIG. 14 shows a schematic representation of a diagram of an example of a method according to an embodiment to select types of session flows of an end user device.

FIG. 14 shows schematically a diagram of a method performed in a communication network according to an embodiment. The method may be performed by the AMF or SMF but it will be understood that it could be equally performed by other another function of the core network.

In this embodiment, the available computational capacity of a BS-CU may be taken into consideration to decide whether to a use a unicast, a multicast, a broadcast session flow or a mix therefore to serve multiple UEs. The decision may be dependent or independent of a UE density (i.e. number of UEs receiving traffic) and/or radio conditions. For a multicast or broadcast session flow there may be limited need for complementary uplink session flows (for feedback, retransmissions, etc.). Thus, it may be computationally less intense to setup a downlink-only multicast or broadcast session flow compared to a unicast session flow (even if there are a limited number of UEs receiving traffic which under normal circumstances may have made unicast session flows more efficient). This may be advantageous in some situations in that only a single session flow may be required for multicast/broadcast session as compared to multiple individual session flows for each user with unicast session flows. Here the AMF or SMF may identify an Xcast session flow (i.e. a session flow that is intended to be delivered over the air to multiple users (i.e. at least two)). The Xcast session flow may be delivered using a mix of unicast, multicast and/or broadcast session flows (hence called Xcast)) with possible assistance from application and session management function.

In step 500, the AMF or SMF may receive and/or identify an Xcast session flow.

In step 502, the AMF or SMF may check the available computational capacity of the BS-CU. If the available computational capacity of the BS-CU is above a threshold, the method goes to step 504. If the available computational capacity of the BS-CU is below a threshold, the method goes to step 506.

In step 504 (i.e. the available computational capacity of the BS-CU is above a threshold), the BS-CU determines the UE density and/or radio conditions with one or more BS-DUs coupled to the BS-CU. The AMF or SMF establishes a unicast, multicast, broadcast flow or a mix thereof depending on UE density and/or radio conditions. For example, if the UE density is above a threshold and/or radio conditions are below a threshold, the AMF or SMF may establish multicast or broadcast session flows with the UEs. If the UE density is below a threshold and/or radio conditions are above a threshold, the AMF or SMF may establish unicast session flows with the UEs.

In step 506 (i.e. the available computational capacity of the BS-CU is below a threshold), the AMF or SMF may establish multicast or broadcast session flows with UEs without uplink session flows.

Figure 15:
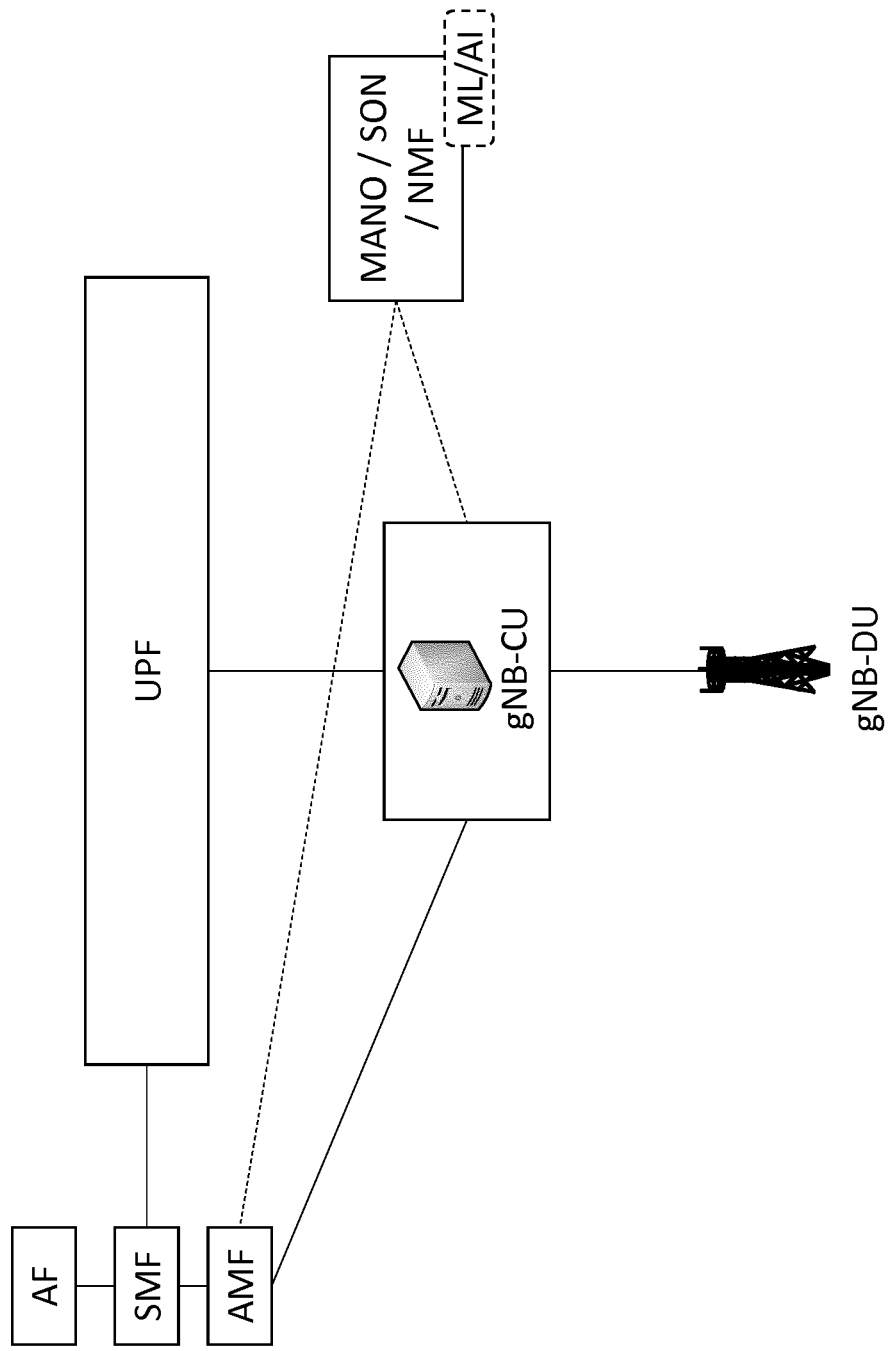
FIG. 15 shows a schematic representation of an example of a communication system according to an embodiment wherein the core network is configured to predict the output when setting up a session flow of an end user device via distributed and centralized radio access network devices.

FIG. 15 shows schematically a communication network according to an embodiment. In this embodiment, the core network comprises a network management function (NMF), a self-organizing network (SON) or a management and orchestration (MANO) entity. The NMF, SON or MANO entities may comprise a machine learning or artificial intelligence module configured to predict the outcome of a possible new session setup based on the real-time evaluation of available computational capacity of a BS-CU and past data related to added computational complexity from initiating a new session setup.

One or more of the above embodiments may provide one or more advantages. In some scenarios, they enable better provisioning of centralized BS pool resources, in particular in 5G networks, taking various radio access network performance and available computational capacity aspects into account. They may provide cost efficiency (due to network provisioning) and flexibility in the network operation. They may provide higher fault tolerance in network operation as well (any fault in the centralized server farm can be overcome quickly by distributing all the tasks to the distributed RRHs).

The required data processing apparatus and functions may be provided by means of one or more data processors. The apparatus may be provided in the communications device, in the control apparatus and/or in the access point. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):
  (i) a combination of analogue and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. In particular, it will be understood that one or more of the above embodiment may be combined. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. An apparatus comprising:
   at least one processor; and
   at least one memory including computer program code;
   the at least one memory and the computer program code configured to, with the at least one processor, cause the apparatus at least to:
   use a first base station central unit coupled to a first base station distributed unit in dependence on a computational capacity of the first base station central unit;
   determine a computational complexity of a past session flow via the first base station central unit and the first base station distributed unit; and
   use the computational capacity of the first base station central unit and the computational complexity of the past session flow set to predict an outcome of setting up a session flow via the first base station central unit and the first base station distributed unit.

2. An apparatus according to claim 1, wherein the computational capacity is an available computational capacity.

3. An apparatus according to claim 1, wherein the at least one memory and the computer program code are configured to, with the at least one processor, cause the apparatus at least to:
   use the first base station central unit coupled to the first base station distributed unit when performing at least one of selecting, reselecting and handing over of a user equipment to the first base station central unit coupled to the first base station distributed unit.

4. An apparatus according to claim 1, wherein the at least one memory and the computer program code are configured to, with the at least one processor, cause the apparatus at least to:
   use the first base station central unit coupled to the first base station distributed unit when setting up a session flow via the first base station central unit coupled to the first base station distributed unit.

5. An apparatus according to claim 4, wherein the at least one memory and the computer program code are configured to, with the at least one processor, cause the apparatus at least to:
   determine to use the first base station central unit coupled to the first base station distributed unit when setting up a unicast, multicast or broadcast session flow via the first base station central unit and the first base station distributed unit.

6. An apparatus according to claim 5, wherein the apparatus is configured to:
   if the computational capacity of the first base station central unit is lower than a threshold, determine that a multicast or broadcast session flow is to be setup via the first base station central unit and the first base station distributed unit without uplink feedback.

7. An apparatus according to claim 5, wherein the apparatus is configured to:
   if the computational capacity of the first base station central unit is greater than or equal to a threshold, determine that a unicast session flow is to be setup via the first base station central unit and the first base station distributed unit without uplink feedback.

8. An apparatus according to claim 1, wherein the at least one memory and the computer program code configured to, with the at least one processor, cause the apparatus at least to:
   compare the computational capacity of the first base station central unit and the computational capacity of a second base station central unit coupled to a second base station distributed unit; and
   determine whether to use the first base station central unit coupled to the first base station distributed unit or the second base station central unit coupled to the second base station distributed unit in dependence on the comparing.

9. An apparatus according to claim 1, wherein the at least one memory and the computer program code configured to, with the at least one processor, cause the apparatus at least to:
report the computational capacity of the first base station central unit to a second base station distributed unit coupled to a second base station central unit.

10. An apparatus according to claim 1, wherein the at least one memory and the computer program code configured to, with the at least one processor, cause the apparatus at least to:
report the computational capacity of the first base station central unit to a second base station central unit coupled to a second base station distributed unit.

11. An apparatus according to claim 1, wherein the at least one memory and the computer program code configured to, with the at least one processor, cause the apparatus at least to:
use the first base station central unit coupled to the first base station distributed unit in dependence on a physical resource availability of the first base station distributed unit.

12. An apparatus according to claim 1, wherein the at least one memory and the computer program code configured to, with the at least one processor, cause the apparatus at least to:
determine a computational complexity of a service requested by a user equipment; and
use the first base station central unit coupled to the first base station distributed unit in dependence on the computational complexity of the service.

13. An apparatus according to claim 1, wherein the at least one memory and the computer program code configured to, with the at least one processor, cause the apparatus at least to:
use the first base station central unit coupled to the first base station distributed unit in dependence on a measurement of a reference signal transmitted by the first base station distributed unit.

14. An apparatus according to claim 1, wherein the at least one memory and the computer program code configured to, with the at least one processor, cause the apparatus at least to:
configure a user equipment to measure the reference signal transmitted by the first base station distributed unit.

15. An apparatus according to claim 1, wherein the at least one memory and the computer program code configured to, with the at least one processor, cause the apparatus at least to:
receive from the first base station distributed unit the computational capacity of the first base station central unit.

16. An apparatus according to claim 1, wherein the at least one memory and the computer program code configured to, with the at least one processor, cause the apparatus at least to:
send a request to the first base station distributed unit for a service.

17. An apparatus according to claim 1, wherein the at least one memory and the computer program code configured to, with the at least one processor, cause the apparatus at least to:
send a request to the first base station distributed unit to perform selection, reselection or hand over.

18. An apparatus according to claim 1, wherein the at least one memory and the computer program code are configured to, with the at least one processor, cause the apparatus at least to:
send a request to the first base station distributed unit to set up a session flow.

19. An apparatus according to claim 1, wherein the at least one memory and the computer program code are configured to, with the at least one processor, cause the apparatus at least to:
send a request to the first base station distributed unit to set up a unicast, multicast or broadcast session flow.

20. A method comprising:
determining to use a first base station central unit coupled to a first base station distributed unit in dependence on a computational capacity of the first base station central unit;
determining a computational complexity of a past session flow via the first base station central unit and the first base station distributed unit; and
using the computational capacity of the first base station central unit and the computational complexity of the past session flow set to predict an outcome of setting up a session flow via the first base station central unit and the first base station distributed unit.

21. A non-transitory computer-readable storage medium comprising instructions stored thereon that, when executed by at least one processor, are configured to cause a computing system to:
determine to use a first base station central unit coupled to a first base station distributed unit in dependence on a computational capacity of the first base station central unit; and;
determine a computational complexity of a past session flow via the first base station central unit and the first base station distributed unit; and
use the computational capacity of the first base station central unit and the computational complexity of the past session flow set to predict an outcome of setting up a session flow via the first base station central unit and the first base station distributed unit.

* * * * *